(12) United States Patent
Nielsen et al.

(10) Patent No.: US 8,583,372 B2
(45) Date of Patent: Nov. 12, 2013

(54) METHODS, APPARATUS, AND SYSTEMS FOR FACILITATING COMPLIANCE WITH MARKING SPECIFICATIONS FOR DISPENSING MARKING MATERIAL

(75) Inventors: Steven Nielsen, North Palm Beach, FL (US); Curtis Chambers, Palm Beach Gardens, FL (US); Jeffrey Farr, Jupiter, FL (US)

(73) Assignee: CertusView Technologies, LLC, Palm Beach Gardens, FL (US)

( * ) Notice: Subject to any disclaimer, the term of this patent is extended or adjusted under 35 U.S.C. 154(b) by 169 days.

(21) Appl. No.: 12/962,016

(22) Filed: Dec. 7, 2010

(65) Prior Publication Data

US 2011/0236588 A1    Sep. 29, 2011

Related U.S. Application Data

(60) Provisional application No. 61/267,114, filed on Dec. 7, 2009.

(51) Int. Cl.
   *G01C 21/00*    (2006.01)

(52) U.S. Cl.
   USPC .............................. 701/521; 427/137; 118/75

(58) Field of Classification Search
   USPC .............................. 427/137; 118/75; 701/521
   See application file for complete search history.

(56) References Cited

U.S. PATENT DOCUMENTS

| | | | |
|---|---|---|---|
| 4,623,282 A | 11/1986 | Allen | |
| 5,056,454 A | 10/1991 | Turner | |
| 5,414,462 A | 5/1995 | Veatch | |
| 5,495,531 A | 2/1996 | Smiedt | |
| 5,576,973 A | 11/1996 | Haddy | |
| 5,644,237 A | 7/1997 | Eslambolchi et al. | |
| 5,699,244 A | 12/1997 | Clark, Jr. | |
| 5,815,411 A | 9/1998 | Ellenby | |
| 5,920,194 A | 7/1999 | Lewis et al. | |
| 5,987,380 A | 11/1999 | Backman | |
| 6,101,087 A | 8/2000 | Sutton | |
| 6,127,827 A | 10/2000 | Lewis | |
| 6,148,292 A | 11/2000 | Reisinger | |
| 6,195,922 B1 | 3/2001 | Stump | |
| 6,201,883 B1 | 3/2001 | Miziu | |
| 6,299,934 B1 | 10/2001 | Manning | |
| 6,351,707 B1 | 2/2002 | Ichikawa | |
| 6,426,872 B1 | 7/2002 | Sutton | |
| 6,430,499 B1 | 8/2002 | Nakano | |

(Continued)

OTHER PUBLICATIONS

International Search Report and Written Opinion, Application No. PCT/US10/059222, Feb. 9, 2011.

(Continued)

*Primary Examiner* — Mark Hellner

(57) ABSTRACT

Control of locating equipment used by a locate technician to perform a locate and/or marking operation to detect and/or mark a presence or an absence of at least one underground facility at a work site is based at least in part on marking specifications (e.g., government-based regulations, industry-based recommended guidelines/best practices, standard operating procedures of locate companies and/or facility owners, and/or contractual obligations relating to marking operations). In various examples, control signals are generated to alert a locate technician when to start and stop dispensing of a marking material, or control signals are generated to automatically or semi-automatically control dispensing of the marking material by a marking device, so as to facilitate compliance with marking specifications.

40 Claims, 6 Drawing Sheets

(56) References Cited

U.S. PATENT DOCUMENTS

| | | |
|---|---|---|
| 6,437,708 B1 | 8/2002 | Brouwer |
| 6,477,475 B1 | 11/2002 | Takaoka et al. |
| 6,493,650 B1 | 12/2002 | Rodgers |
| 6,650,293 B1 | 11/2003 | Eslambolchi |
| 6,710,741 B2 | 3/2004 | Tucker |
| 6,723,375 B2 | 4/2004 | Zeck et al. |
| 6,751,552 B1 | 6/2004 | Minelli |
| 6,751,553 B2 | 6/2004 | Young |
| 6,751,554 B1 | 6/2004 | Asher et al. |
| 6,772,142 B1 | 8/2004 | Kelling et al. |
| 6,778,128 B2 | 8/2004 | Tucker et al. |
| 6,853,905 B2 | 2/2005 | Barton |
| 6,873,998 B1 | 3/2005 | Dorum |
| 6,895,356 B2 | 5/2005 | Brimhall |
| 6,898,525 B1 | 5/2005 | Minelli |
| 6,904,361 B1 | 6/2005 | Tallman et al. |
| 6,950,535 B2 | 9/2005 | Sibayama |
| 6,956,524 B2 | 10/2005 | Tucker et al. |
| 6,958,690 B1 | 10/2005 | Asher et al. |
| 6,972,698 B2 | 12/2005 | Deguchi |
| 6,999,021 B2 | 2/2006 | Taylor, Jr. |
| 7,003,138 B2 | 2/2006 | Wilson |
| 7,009,399 B2 * | 3/2006 | Olsson et al. ............ 324/326 |
| 7,027,653 B2 | 4/2006 | Hino |
| 7,120,564 B2 | 10/2006 | Pacey |
| 7,142,196 B1 | 11/2006 | Connor |
| 7,185,021 B2 | 2/2007 | Kishigami |
| 7,216,034 B2 | 5/2007 | Vitikainen |
| 7,262,797 B2 | 8/2007 | Weldum |
| 7,372,247 B1 | 5/2008 | Giusti et al. |
| 7,400,976 B2 | 7/2008 | Young et al. |
| 7,417,641 B1 | 8/2008 | Barber |
| 7,437,830 B1 | 10/2008 | Kulavic |
| 7,469,247 B2 | 12/2008 | Cossins et al. |
| 7,584,123 B1 | 9/2009 | Karonis et al. |
| 7,613,331 B2 | 11/2009 | Maeda |
| 7,626,496 B1 | 12/2009 | Asher et al. |
| 7,636,901 B2 | 12/2009 | Munson |
| 7,640,105 B2 | 12/2009 | Nielsen et al. |
| 7,664,530 B2 | 2/2010 | Skelton |
| 7,773,095 B1 | 8/2010 | Badrak et al. |
| 7,777,648 B2 | 8/2010 | Smith et al. |
| 7,886,616 B1 | 2/2011 | Hayman |
| 7,889,888 B2 | 2/2011 | Deardorr |
| 7,978,129 B2 | 7/2011 | Sawyer et al. |
| 7,990,151 B2 | 8/2011 | Olsson |
| 8,045,995 B2 | 10/2011 | King |
| 8,060,304 B2 | 11/2011 | Nielsen et al. |
| 8,126,788 B2 | 2/2012 | Pappas |
| 8,155,390 B2 | 4/2012 | Nielsen et al. |
| 8,194,932 B2 | 6/2012 | Nielsen et al. |
| 8,218,827 B2 | 7/2012 | Nielsen et al. |
| 8,249,306 B2 | 8/2012 | Nielsen et al. |
| 8,260,489 B2 | 9/2012 | Nielsen et al. |
| 8,265,344 B2 | 9/2012 | Nielsen et al. |
| 8,270,666 B2 | 9/2012 | Nielsen et al. |
| 8,280,117 B2 | 10/2012 | Nielsen et al. |
| 8,280,631 B2 | 10/2012 | Nielsen et al. |
| 8,280,969 B2 | 10/2012 | Nielsen et al. |
| 8,290,204 B2 | 10/2012 | Nielsen et al. |
| 8,290,215 B2 | 10/2012 | Nielsen et al. |
| 8,296,308 B2 | 10/2012 | Nielsen et al. |
| 8,300,895 B2 | 10/2012 | Nielsen et al. |
| 8,301,380 B2 | 10/2012 | Nielsen et al. |
| 8,311,765 B2 | 11/2012 | Nielsen et al. |
| 8,340,359 B2 | 12/2012 | Nielsen et al. |
| 8,355,542 B2 | 1/2013 | Nielsen et al. |
| 8,356,255 B2 | 1/2013 | Nielsen et al. |
| 8,361,543 B2 | 1/2013 | Nielsen et al. |
| 8,374,789 B2 | 2/2013 | Nielsen et al. |
| 8,384,742 B2 | 2/2013 | Nielsen et al. |
| 8,386,178 B2 | 2/2013 | Nielsen et al. |
| 8,401,791 B2 | 3/2013 | Nielsen et al. |
| 8,407,001 B2 | 3/2013 | Nielsen et al. |
| 8,416,995 B2 | 4/2013 | Nielsen et al. |
| 8,457,893 B2 | 6/2013 | Nielsen et al. |
| 8,463,487 B2 | 6/2013 | Nielsen et al. |
| 2001/0036295 A1 | 11/2001 | Hendrickson |
| 2002/0013704 A1 | 1/2002 | Finney |
| 2002/0052755 A1 | 5/2002 | Whatley |
| 2002/0087264 A1 | 7/2002 | Hills et al. |
| 2002/0184235 A1 | 12/2002 | Young |
| 2003/0012411 A1 | 1/2003 | Sjostrom |
| 2003/0069648 A1 | 4/2003 | Douglas |
| 2004/0006425 A1 | 1/2004 | Wood |
| 2004/0008582 A1 | 1/2004 | Richareds |
| 2004/0073578 A1 | 4/2004 | Nam |
| 2004/0146185 A1 | 7/2004 | Blair |
| 2004/0151388 A1 | 8/2004 | Maeda |
| 2004/0176978 A1 | 9/2004 | Simon |
| 2004/0203909 A1 | 10/2004 | Koster |
| 2004/0210370 A1 | 10/2004 | Gudat |
| 2004/0210386 A1 | 10/2004 | Wood |
| 2005/0033513 A1 | 2/2005 | Gasbarro |
| 2005/0034074 A1 | 2/2005 | Munson |
| 2005/0046584 A1 | 3/2005 | Breed |
| 2005/0057745 A1 | 3/2005 | Bontje |
| 2005/0125389 A1 | 6/2005 | Hazzard et al. |
| 2005/0192752 A1 | 9/2005 | Rooney |
| 2005/0203768 A1 | 9/2005 | Florance |
| 2005/0219268 A1 | 10/2005 | Kyle |
| 2006/0020417 A1 | 1/2006 | Koch et al. |
| 2006/0058945 A1 | 3/2006 | Watanabe |
| 2006/0077095 A1 | 4/2006 | Tucker et al. |
| 2006/0085396 A1 | 4/2006 | Evans |
| 2006/0161349 A1 | 7/2006 | Cross |
| 2006/0229809 A1 | 10/2006 | Chen |
| 2006/0282280 A1 | 12/2006 | Stotz et al. |
| 2007/0027591 A1 | 2/2007 | Goldenberg |
| 2007/0076920 A1 | 4/2007 | Ofek |
| 2007/0100768 A1 | 5/2007 | Boccon-Gibod et al. |
| 2007/0143676 A1 | 6/2007 | Chen |
| 2007/0182721 A1 | 8/2007 | Watanabe et al. |
| 2007/0187574 A1 | 8/2007 | Lia |
| 2007/0219722 A1 | 9/2007 | Sawyer, Jr. |
| 2007/0286021 A1 | 12/2007 | Hoenmans et al. |
| 2008/0021863 A1 | 1/2008 | Evans |
| 2008/0059889 A1 | 3/2008 | Parker et al. |
| 2008/0109751 A1 | 5/2008 | Fitzmaurice et al. |
| 2008/0125942 A1 | 5/2008 | Tucker et al. |
| 2008/0180322 A1 | 7/2008 | Islam |
| 2008/0208415 A1 | 8/2008 | Vik |
| 2008/0275591 A1 | 11/2008 | Chirnomas |
| 2008/0288267 A1 | 11/2008 | Asher |
| 2009/0004410 A1 | 1/2009 | Thomson et al. |
| 2009/0013806 A1 | 1/2009 | Miller et al. |
| 2009/0070071 A1 | 3/2009 | Wood |
| 2009/0100185 A1 | 4/2009 | Shehan et al. |
| 2009/0121937 A1 | 5/2009 | Kaegebein |
| 2009/0201311 A1 | 8/2009 | Nielsen et al. |
| 2009/0202101 A1 | 8/2009 | Nielsen et al. |
| 2009/0204238 A1 | 8/2009 | Nielsen et al. |
| 2009/0204466 A1 | 8/2009 | Nielsen et al. |
| 2009/0207019 A1 | 8/2009 | Nielsen et al. |
| 2009/0208642 A1 | 8/2009 | Nielsen et al. |
| 2009/0210098 A1 | 8/2009 | Nielsen et al. |
| 2009/0210284 A1 | 8/2009 | Nielsen et al. |
| 2009/0210285 A1 | 8/2009 | Nielsen et al. |
| 2009/0210298 A1 | 8/2009 | Nielsen et al. |
| 2009/0238415 A1 | 9/2009 | Nielsen et al. |
| 2009/0324815 A1 | 12/2009 | Nielsen et al. |
| 2009/0327024 A1 | 12/2009 | Nielsen et al. |
| 2010/0006667 A1 | 1/2010 | Nielsen et al. |
| 2010/0010862 A1 | 1/2010 | Nielsen et al. |
| 2010/0010863 A1 | 1/2010 | Nielsen et al. |
| 2010/0010882 A1 | 1/2010 | Nielsen et al. |
| 2010/0010883 A1 | 1/2010 | Nielsen et al. |
| 2010/0064341 A1 | 3/2010 | Aldera |
| 2010/0084532 A1 | 4/2010 | Nielsen et al. |
| 2010/0085694 A1 | 4/2010 | Nielsen et al. |
| 2010/0085701 A1 | 4/2010 | Nielsen et al. |
| 2010/0088031 A1 | 4/2010 | Nielsen et al. |
| 2010/0088032 A1 | 4/2010 | Nielsen et al. |
| 2010/0088134 A1 | 4/2010 | Nielsen et al. |

(56) References Cited

U.S. PATENT DOCUMENTS

| | | |
|---|---|---|
| 2010/0088135 A1 | 4/2010 | Nielsen et al. |
| 2010/0088164 A1 | 4/2010 | Nielsen et al. |
| 2010/0090700 A1 | 4/2010 | Nielsen et al. |
| 2010/0117654 A1 | 5/2010 | Nielsen et al. |
| 2010/0188088 A1 | 7/2010 | Nielsen et al. |
| 2010/0188215 A1 | 7/2010 | Nielsen et al. |
| 2010/0188216 A1 | 7/2010 | Nielsen et al. |
| 2010/0188245 A1 | 7/2010 | Nielsen et al. |
| 2010/0188407 A1 | 7/2010 | Nielsen et al. |
| 2010/0189312 A1 | 7/2010 | Nielsen et al. |
| 2010/0189887 A1 | 7/2010 | Nielsen et al. |
| 2010/0198663 A1 | 8/2010 | Nielsen et al. |
| 2010/0201690 A1 | 8/2010 | Nielsen et al. |
| 2010/0205031 A1 | 8/2010 | Nielsen et al. |
| 2010/0205032 A1 | 8/2010 | Nielsen et al. |
| 2010/0205264 A1 | 8/2010 | Nielsen et al. |
| 2010/0205536 A1 | 8/2010 | Nielsen et al. |
| 2010/0205554 A1 | 8/2010 | Nielsen et al. |
| 2010/0228588 A1 | 9/2010 | Nielsen et al. |
| 2010/0245086 A1 | 9/2010 | Nielsen et al. |
| 2010/0247754 A1 | 9/2010 | Nielsen et al. |
| 2010/0253511 A1 | 10/2010 | Nielsen et al. |
| 2010/0253513 A1 | 10/2010 | Nielsen et al. |
| 2010/0253514 A1 | 10/2010 | Nielsen et al. |
| 2010/0255182 A1 | 10/2010 | Nielsen et al. |
| 2010/0256825 A1 | 10/2010 | Nielsen et al. |
| 2010/0256912 A1 | 10/2010 | Nielsen et al. |
| 2010/0256981 A1 | 10/2010 | Nielsen et al. |
| 2010/0257029 A1 | 10/2010 | Nielsen et al. |
| 2010/0257477 A1 | 10/2010 | Nielsen et al. |
| 2010/0259381 A1 | 10/2010 | Nielsen et al. |
| 2010/0259414 A1 | 10/2010 | Nielsen et al. |
| 2010/0262470 A1 | 10/2010 | Nielsen et al. |
| 2010/0262670 A1 | 10/2010 | Nielsen et al. |
| 2010/0263591 A1 | 10/2010 | Nielsen et al. |
| 2010/0272885 A1* | 10/2010 | Olsson et al. ............ 427/137 |
| 2010/0285211 A1 | 11/2010 | Nielsen et al. |
| 2010/0318401 A1 | 12/2010 | Nielsen et al. |
| 2010/0318402 A1 | 12/2010 | Nielsen et al. |
| 2010/0318465 A1 | 12/2010 | Nielsen et al. |
| 2010/0324967 A1 | 12/2010 | Nielsen et al. |
| 2011/0007076 A1 | 1/2011 | Nielsen et al. |
| 2011/0020776 A1 | 1/2011 | Nielsen et al. |
| 2011/0022433 A1 | 1/2011 | Nielsen et al. |
| 2011/0035245 A1 | 2/2011 | Nielsen et al. |
| 2011/0035251 A1 | 2/2011 | Nielsen et al. |
| 2011/0035252 A1 | 2/2011 | Nielsen et al. |
| 2011/0035260 A1 | 2/2011 | Nielsen et al. |
| 2011/0035324 A1 | 2/2011 | Nielsen et al. |
| 2011/0035328 A1 | 2/2011 | Nielsen et al. |
| 2011/0040589 A1 | 2/2011 | Nielsen et al. |
| 2011/0040590 A1 | 2/2011 | Nielsen et al. |
| 2011/0043211 A1* | 2/2011 | Olsson et al. ............ 324/329 |
| 2011/0045175 A1 | 2/2011 | Nielsen et al. |
| 2011/0046993 A1 | 2/2011 | Nielsen et al. |
| 2011/0046994 A1 | 2/2011 | Nielsen et al. |
| 2011/0046999 A1 | 2/2011 | Nielsen et al. |
| 2011/0060496 A1 | 3/2011 | Nielsen et al. |
| 2011/0060549 A1 | 3/2011 | Nielsen et al. |
| 2011/0093162 A1 | 4/2011 | Nielsen et al. |
| 2011/0093306 A1 | 4/2011 | Nielsen et al. |
| 2011/0095885 A9 | 4/2011 | Nielsen et al. |
| 2011/0117272 A1 | 5/2011 | Nielsen et al. |
| 2011/0131081 A1 | 6/2011 | Nielsen et al. |
| 2011/0137769 A1 | 6/2011 | Nielsen et al. |
| 2011/0236588 A1 | 9/2011 | Nielsen et al. |
| 2011/0241936 A1 | 10/2011 | Sawyer, Jr. et al. |
| 2011/0249394 A1 | 10/2011 | Nielsen et al. |
| 2011/0279229 A1 | 11/2011 | Nielsen et al. |
| 2011/0279230 A1 | 11/2011 | Nielsen et al. |
| 2011/0279476 A1 | 11/2011 | Nielsen et al. |
| 2011/0283217 A1 | 11/2011 | Nielsen et al. |
| 2011/0285749 A1 | 11/2011 | Nielsen et al. |
| 2012/0019380 A1 | 1/2012 | Nielsen et al. |
| 2012/0036140 A1 | 2/2012 | Nielsen et al. |
| 2012/0065924 A1 | 3/2012 | Nielsen et al. |
| 2012/0065944 A1 | 3/2012 | Nielsen et al. |
| 2012/0066137 A1 | 3/2012 | Nielsen et al. |
| 2012/0066273 A1 | 3/2012 | Nielsen et al. |
| 2012/0066506 A1 | 3/2012 | Nielsen et al. |
| 2012/0069178 A1 | 3/2012 | Nielsen et al. |
| 2012/0072035 A1 | 3/2012 | Nielsen et al. |
| 2012/0110019 A1 | 5/2012 | Nielsen et al. |
| 2012/0113244 A1 | 5/2012 | Nielsen et al. |
| 2012/0274476 A1 | 11/2012 | Nielsen et al. |
| 2012/0328162 A1 | 12/2012 | Nielsen et al. |
| 2012/0330849 A1 | 12/2012 | Nielsen et al. |
| 2013/0002854 A1 | 1/2013 | Nielsen et al. |
| 2013/0006718 A1 | 1/2013 | Nielsen et al. |
| 2013/0044918 A1 | 2/2013 | Nielsen et al. |

OTHER PUBLICATIONS

Office Action dated Dec. 10, 2012 from U.S. Appl. No. 12/940,820.

Nielsen et al., co-pending U.S. Publication No. 2011-0137769, published Jun. 9, 2011.

Notice of Allowance dated Jul. 3, 2013 from U.S. Appl. No. 12/940,820.

* cited by examiner

METHODS, APPARATUS, AND SYSTEMS FOR FACILITATING COMPLIANCE WITH MARKING SPECIFICATIONS FOR DISPENSING MARKING MATERIAL

CROSS-REFERENCE TO RELATED APPLICATIONS

This application claims the benefit, under 35 U.S.C. §119 (e), of U.S. Provisional Patent Application No. 61/267,114, filed on Dec. 7, 2009, entitled "System for and Methods of Ensuring Regulatory Compliance with Respect to Dispensing Marking Material in Marking operations," which application is hereby incorporated herein by reference in its entirety.

BACKGROUND

In the construction industry, the process of locating and marking underground facilities is required prior to excavation activity. In this process, locate and marking operations are generally performed at the request of excavators via a locate request ticket. For example, excavators may submit locate request tickets to one-call centers who then distribute the tickets to locate service providers (hereafter referred to as locate companies). The locate companies then assign the tickets to, for example, locate technicians that are dispatched into the field to perform the requested marking operations.

A locate technician may use a locate receiver device and a marking device to perform a marking operation. A locate receiver is an instrument for detecting facilities that are concealed in some manner, such as cables and pipes that are located underground. A locate receiver detects electromagnetic fields that are emitted from a facility. A signal, or lack thereof, detected by the locate receiver indicates the presence or absence of a facility. The source of the detection signal along the facility may be a locate transmitter. When the presence or absence of a facility is detected, a marking material is dispensed on ground, pavement or other surface, for example, at the location of the facility in order to communicate the presence or absence of a facility or facilities to an excavator. The color of the marking material is typically chosen based on the type of underground facility that is being marked (e.g., red paint for a power line), pursuant to various guidelines in the industry (e.g., the American Public Works Association (APWA) Uniform Color Codes for temporary marking of underground utilities).

Marking regulations for underground facility marking operations exist in various jurisdictions, typically on the state and local level. Marking regulations, recommendations or guidelines also may be promulgated by various entities supporting safety efforts in the area of excavation and utility locating/marking operations. For example, the Common Ground Alliance (CGA) is a member-driven association dedicated to ensuring public safety, environmental protection, and the integrity of services by promoting effective damage prevention practices in connection with underground facilities. Similarly, the National Utility Locating Contractors Association (NULCA), formed in 1994, is an organization of contract locators, facility owners, one-call centers, excavators, and Industry Suppliers that share a common interest in safety and damage prevention. Such associations and organizations, as well as various government-based authorities, may provide regulations, recommended best practices and/or guidelines for various activities in connection with locate and marking operations. More specifically, regarding marking operations involving the dispensing of marking material, marking regulations may specify the spacing between marks along the line of facilities being marked. The spacing specification may vary, for example, from one facility type to another. The spacing specification may also vary from one customer (e.g., facility/utility owner) to another. Additionally, the spacing specification may be dependent on the length of the run (i.e., short run vs. long run).

SUMMARY

Notwithstanding the existence of various marking regulations, guidelines and recommendations with respect to dispensing marking material in marking operations, Applicants have recognized that it is commonplace for locate technicians to "over spray" and/or "under spray" when performing marking operations. As a result, it is not uncommon for locate companies to be out of compliance with respect to the amount of marking material that is dispensed during marking operations. Consequently, locate companies may be subject to fines and/or other penalties due to dispensing marking material in a non-compliant manner, may be required to perform the work over again, which is costly and inefficient, and/or may have dissatisfied customers, leading to loss of future business.

Additionally, Applicants have recognized that in the underground facility locate industry, the aggregate cost of the marking material for marking multiple locations may be substantial. However, while substantial in the aggregate, individual dispensers of marking material are relatively inexpensive. Accordingly, the consumption of marking material is difficult to track and/or control as the cost of individual dispensers is generally considered insignificant by the locate technicians who, therefore, tend to be wasteful. For example, the tendency of locate technicians to over spray with respect to marking regulations is wasteful. Consequently, over time a significant amount of useful marking material may be lost and, therefore, the cost of supplying and/or replenishing the marking material is not optimized.

In view of the foregoing, Applicants have recognized and appreciated a need to ensure compliance with marking regulations when dispensing marking material using locate equipment in marking operations, so as to reduce, and preferably avoid entirely, over spraying and/or under spraying marking material when performing marking operations. Applicants further have recognized and appreciated a need to better control the consumption of marking material in underground facility locate applications to reduce, and preferably eliminate, the tendency to over-spray marking material in marking operations in order to reduce wastefulness.

Accordingly, various inventive methods, apparatus, and systems disclosed herein relate generally to facilitating compliance with marking specifications for dispensing marking material during marking operations.

For purposes of the present disclosure, and as discussed in further detail below, examples of "marking specifications" with which various embodiments of the present invention facilitate compliance include, but are not limited to: federal, state, or local statutes or regulations relating to one or more aspects of marking ground, pavement or other surfaces in connection with underground facilities; recommendations, guidelines or best practices promulgated by an industry association or organization (e.g., CGA, NUCLA) relating to marking operations; locate company, locate contractor, and/ or facility owner best practices or standard operating procedures relating to marking operations; and specified contractual obligations for performance of marking operations.

In exemplary embodiments, marking specifications may define one or more marking patterns to be applied, such as on the ground, pavement, or other surface, in and around an excavation work site, or more specifically in one or more dig areas of a work site, in connection with an underground facility locate and marking operation. The marking patterns may indicate the presence or absence of an underground facility and/or one or more dig areas themselves, and may constitute various types of lines, symbols, and/or alphanumeric characters. The marking specifications may, for example, be included in marking regulations generated by a government body, a company or another entity as noted above. The marking specifications may define parameters, such as for example length, spacing and other requirements, of marks to be dispensed on the ground for marking the presence or absence of an underground facility.

In exemplary embodiments, a marking material control system may include a marking control application which operates in combination with a marking device that is configured to track and/or log actual and/or relative geographic location/position. For example, in some implementations, a marking device according to one embodiment may include a location tracking system to determine location/position in any one or more of a variety of manners. The marking control application may process the marking specifications, location information produced by the location tracking system and actuation information representative of actuation of the marking device, and may generate control information to in some manner facilitate compliance with the marking specifications (e.g., enable/disable dispensing of a marking material according to the marking specifications). The marking specifications may, for example, be read from a table of marking regulations (e.g., stored in memory of the marking device or downloaded to the marking device via a communications interface). In some embodiments, the control information includes a leading prompt to prompt a user to begin dispensing the marking material and a trailing prompt to cause a user to stop dispensing the marking material.

In sum, one embodiment of the present invention is directed to an apparatus for controlling a marking device used by a locate technician to perform a marking operation to mark a presence or an absence of at least one underground facility at a work site. The apparatus comprises a memory to store processor-executable instructions, and at least one processing unit communicatively coupled to the memory. Upon execution of the processor-executable instructions, the at least one processing unit generates at least one control signal relating to dispensing of a marking material by the marking device based at least in part on: marking specifications that define one or more marking patterns to be applied on ground, pavement or other surface at the work site; location information representative of a location of the marking device during the marking operation; and actuation information representative of one or more actuations of the marking device to dispense the marking material.

Another embodiment is directed to a computer-implemented method for controlling a marking device during a marking operation to mark a presence or an absence of at least one underground facility at a work site. The method comprises generating at least one control signal relating to dispensing of a marking material by the marking device based at least in part on: marking specifications that define one or more marking patterns to be applied on ground, pavement or other surface at the work site; location information representative of a location of the marking device during the marking operation; and actuation information representative of one or more actuations of the marking device to dispense the marking material.

Another embodiment is directed to a computer-readable storage medium encoded with computer-readable instructions that, as a result of being executed by a computing device, control the computing device to perform a method for controlling a marking device during a marking operation to mark a presence or an absence of at least one underground facility at a work site. The method comprises generating at least one control signal relating to dispensing of a marking material by the marking device based at least in part on: marking specifications that define one or more marking patterns to be applied on ground, pavement or other surface at the work site; location information representative of a location of the marking device during the marking operation; and actuation information representative of one or more actuations of the marking device to dispense the marking material.

Another embodiment is directed to a computer-implemented method for controlling a marking device during an underground facility marking operation. The method comprises A) receiving marking specifications that define one or more marking patterns to be applied in a dig area in connection with the underground facility marking operation; B) receiving location information representative of location of the marking device during the underground facility marking operation; C) receiving actuation information representative of actuation of the marking device to dispense a marking material; and D) generating control information, responsive to the marking specifications, the location information and the actuation information, to enable dispensing of the marking material according to the marking specifications.

Another embodiment is directed to a non-transitory computer-readable storage medium encoded with computer-readable instructions that, as a result of being executed by a computing device, control the computing device to perform a method for controlling a marking device during an underground facility marking operation. The method comprises: A) receiving marking specifications that define at least one marking pattern to be applied in a dig area in connection with the underground facility marking operation; B) receiving location information representative of location of the marking device during the underground facility marking operation; C) receiving actuation information representative of actuation of the marking device to dispense a marking material; and D) generating control information, responsive to the marking specifications, the location information and the actuation information, to enable dispensing of the marking material according to the marking specifications.

Another embodiment is directed to a marking device for performing at least part of an underground facility marking operation. The marking device includes a marking mechanism to dispense a marking material, a processing device, and a memory. The memory contains a marking control application, for execution by the processing device, to receive marking specifications that define at least one marking pattern to be applied in a dig area in connection with the underground facility marking operation, to receive location information representative of location of the marking device during the underground facility marking operation, to receive actuation information representative of actuation of the marking mechanism to dispense a marking material, and to generate control information, responsive to the marking specifications, the location information and the actuation information, to enable dispensing of the marking material according to the marking specifications.

Yet another embodiment is directed toward a marking material control system. The system includes a marking device configured to dispense a marking material in response to actuation of the marking device, the marking device including a location tracking system to determine the location of the marking device during an underground facility marking operation. The system also includes a marking control application configured to generate control information to enable dispensing of the marking material in response to marking specifications that define at least one marking pattern to be applied in a dig area in connection with the underground facility marking operation, location information provided by the location tracking system of the marking device and actuation information representative of actuation of the marking device.

For purposes of the present disclosure, the term "dig area" refers to a specified area of a work site within which there is a plan to disturb the ground (e.g., excavate, dig holes and/or trenches, bore, etc.), and beyond which there is no plan to excavate in the immediate surroundings. Thus, the metes and bounds of a dig area are intended to provide specificity as to where some disturbance to the ground is planned at a given work site. It should be appreciated that a given work site may include multiple dig areas.

The term "facility" refers to one or more lines, cables, fibers, conduits, transmitters, receivers, or other physical objects or structures capable of or used for carrying, transmitting, receiving, storing, and providing utilities, energy, data, substances, and/or services, and/or any combination thereof. The term "underground facility" means any facility beneath the surface of the ground. Examples of facilities include, but are not limited to, oil, gas, water, sewer, power, telephone, data transmission, cable television (TV), and/or internet services.

The term "locate device" refers to any apparatus and/or device for detecting and/or inferring the presence or absence of any facility, including without limitation, any underground facility. In various examples, a locate device may include both a locate transmitter and a locate receiver (which in some instances may also be referred to collectively as a "locate instrument set," or simply "locate set").

The term "marking device" refers to any apparatus, mechanism, or other device that employs a marking dispenser for causing a marking material and/or marking object to be dispensed, or any apparatus, mechanism, or other device for electronically indicating (e.g., logging in memory) a location, such as a location of an underground facility. Additionally, the term "marking dispenser" refers to any apparatus, mechanism, or other device for dispensing and/or otherwise using, separately or in combination, a marking material and/or a marking object. An example of a marking dispenser may include, but is not limited to, a pressurized can of marking paint. The term "marking material" means any material, substance, compound, and/or element, used or which may be used separately or in combination to mark, signify, and/or indicate. Examples of marking materials may include, but are not limited to, paint, chalk, dye, and/or iron. The term "marking object" means any object and/or objects used or which may be used separately or in combination to mark, signify, and/or indicate. Examples of marking objects may include, but are not limited to, a flag, a dart, and arrow, and/or an RFID marking ball. It is contemplated that marking material may include marking objects. It is further contemplated that the terms "marking materials" or "marking objects" may be used interchangeably in accordance with the present disclosure.

The term "locate mark" means any mark, sign, and/or object employed to indicate the presence or absence of any underground facility. Examples of locate marks may include, but are not limited to, marks made with marking materials, marking objects, global positioning or other information, and/or any other means. Locate marks may be represented in any form including, without limitation, physical, visible, electronic, and/or any combination thereof.

The terms "actuate" or "trigger" (verb form) are used interchangeably to refer to starting or causing any device, program, system, and/or any combination thereof to work, operate, and/or function in response to some type of signal or stimulus. Examples of actuation signals or stimuli may include, but are not limited to, any local or remote, physical, audible, inaudible, visual, non-visual, electronic, mechanical, electromechanical, biomechanical, biosensing or other signal, instruction, or event. The terms "actuator" or "trigger" (noun form) are used interchangeably to refer to any method or device used to generate one or more signals or stimuli to cause or causing actuation. Examples of an actuator/trigger may include, but are not limited to, any form or combination of a lever, switch, program, processor, screen, microphone for capturing audible commands, and/or other device or method. An actuator/trigger may also include, but is not limited to, a device, software, or program that responds to any movement and/or condition of a user, such as, but not limited to, eye movement, brain activity, heart rate, other data, and/or the like, and generates one or more signals or stimuli in response thereto. In the case of a marking device or other marking mechanism (e.g., to physically or electronically mark a facility or other feature), actuation may cause marking material to be dispensed, as well as various data relating to the marking operation (e.g., geographic location, time stamps, characteristics of material dispensed, etc.) to be logged in an electronic file stored in memory. In the case of a locate device or other locate mechanism (e.g., to physically locate a facility or other feature), actuation may cause a detected signal strength, signal frequency, depth, or other information relating to the marking operation to be logged in an electronic file stored in memory.

The terms "locate and marking operation," "marking operation," and "locate" generally are used interchangeably and refer to any activity to detect, infer, and/or mark the presence or absence of an underground facility. In some contexts, the term "marking operation" is used to more specifically refer to detection of one or more underground facilities, and the term "marking operation" is used to more specifically refer to using a marking material and/or one or more marking objects to mark a presence or an absence of one or more underground facilities. The term "locate technician" refers to an individual performing a marking operation. A locate and marking operation often is specified in connection with a dig area, at least a portion of which may be excavated or otherwise disturbed during excavation activities.

The term "user" refers to an individual utilizing a locate device and/or a marking device and may include, but is not limited to, land surveyors, locate technicians, and support personnel.

The term "locate request ticket" (or simply "ticket") refers to any communication or instruction to perform a marking operation. A ticket might specify, for example, the address or description of a dig area to be marked, the day and/or time that the dig area is to be marked, and/or whether the user is to mark the excavation area for certain gas, water, sewer, power, telephone, cable television, and/or some other underground facility.

The following U.S. published applications are hereby incorporated herein by reference:

U.S. Pat. No. 7,640,105, issued Dec. 29, 2009, filed Mar. 13, 2007, and entitled "Marking System and Method With Location and/or Time Tracking;"

U.S. publication no. 2010-0094553-A1, published Apr. 15, 2010, filed Dec. 16, 2009, and entitled "Systems and Methods for Using Location Data and/or Time Data to Electronically Display Dispensing of Markers by A Marking System or Marking Tool;"

U.S. publication no. 2008-0245299-A1, published Oct. 9, 2008, filed Apr. 4, 2007, and entitled "Marking System and Method;"

U.S. publication no. 2009-0013928-A1, published Jan. 15, 2009, filed Sep. 24, 2008, and entitled "Marking System and Method;"

U.S. publication no. 2010-0090858-A1, published Apr. 15, 2010, filed Dec. 16, 2009, and entitled "Systems and Methods for Using Marking Information to Electronically Display Dispensing of Markers by a Marking System or Marking Tool;"

U.S. publication no. 2009-0238414-A1, published Sep. 24, 2009, filed Mar. 18, 2008, and entitled "Virtual White Lines for Delimiting Planned Excavation Sites;"

U.S. publication no. 2009-0241045-A1, published Sep. 24, 2009, filed Sep. 26, 2008, and entitled "Virtual White Lines for Delimiting Planned Excavation Sites;"

U.S. publication no. 2009-0238415-A1, published Sep. 24, 2009, filed Sep. 26, 2008, and entitled "Virtual White Lines for Delimiting Planned Excavation Sites;"

U.S. publication no. 2009-0241046-A1, published Sep. 24, 2009, filed Jan. 16, 2009, and entitled "Virtual White Lines for Delimiting Planned Excavation Sites;"

U.S. publication no. 2009-0238416-A1, published Sep. 24, 2009, filed Jan. 16, 2009, and entitled "Virtual White Lines for Delimiting Planned Excavation Sites;"

U.S. publication no. 2009-0237408-A1, published Sep. 24, 2009, filed Jan. 16, 2009, and entitled "Virtual White Lines for Delimiting Planned Excavation Sites;"

U.S. publication no. 2009-0202101-A1, published Aug. 13, 2009, filed Feb. 12, 2008, and entitled "Electronic Manifest of Underground Facility Locate Marks;"

U.S. publication no. 2009-0202110-A1, published Aug. 13, 2009, filed Sep. 11, 2008, and entitled "Electronic Manifest of Underground Facility Locate Marks;"

U.S. publication no. 2009-0201311-A1, published Aug. 13, 2009, filed Jan. 30, 2009, and entitled "Electronic Manifest of Underground Facility Locate Marks;"

U.S. publication no. 2009-0202111-A1, published Aug. 13, 2009, filed Jan. 30, 2009, and entitled "Electronic Manifest of Underground Facility Locate Marks;"

U.S. publication no. 2009-0204625-A1, published Aug. 13, 2009, filed Feb. 5, 2009, and entitled "Electronic Manifest of Underground Facility Marking operation;"

U.S. publication no. 2009-0204466-A1, published Aug. 13, 2009, filed Sep. 4, 2008, and entitled "Ticket Approval System For and Method of Performing Quality Control In Field Service Applications;"

U.S. publication no. 2009-0207019-A1, published Aug. 20, 2009, filed Apr. 30, 2009, and entitled "Ticket Approval System For and Method of Performing Quality Control In Field Service Applications;"

U.S. publication no. 2009-0210284-A1, published Aug. 20, 2009, filed Apr. 30, 2009, and entitled "Ticket Approval System For and Method of Performing Quality Control In Field Service Applications;"

U.S. publication no. 2009-0210297-A1, published Aug. 20, 2009, filed Apr. 30, 2009, and entitled "Ticket Approval System For and Method of Performing Quality Control In Field Service Applications;"

U.S. publication no. 2009-0210298-A1, published Aug. 20, 2009, filed Apr. 30, 2009, and entitled "Ticket Approval System For and Method of Performing Quality Control In Field Service Applications;"

U.S. publication no. 2009-0210285-A1, published Aug. 20, 2009, filed Apr. 30, 2009, and entitled "Ticket Approval System For and Method of Performing Quality Control In Field Service Applications;"

U.S. publication no. 2009-0324815-A1, published Dec. 31, 2009, filed Apr. 24, 2009, and entitled "Marking Apparatus and Marking Methods Using Marking Dispenser with Machine-Readable ID Mechanism;"

U.S. publication no. 2010-0006667-A1, published Jan. 14, 2010, filed Apr. 24, 2009, and entitled, "Marker Detection Mechanisms for use in Marking Devices And Methods of Using Same;"

U.S. publication no. 2010-0085694 A1, published Apr. 8, 2010, filed Sep. 30, 2009, and entitled, "Marking Device Docking Stations and Methods of Using Same;"

U.S. publication no. 2010-0085701 A1, published Apr. 8, 2010, filed Sep. 30, 2009, and entitled, "Marking Device Docking Stations Having Security Features and Methods of Using Same;"

U.S. publication no. 2010-0084532 A1, published Apr. 8, 2010, filed Sep. 30, 2009, and entitled, "Marking Device Docking Stations Having Mechanical Docking and Methods of Using Same;"

U.S. publication no. 2010-0088032-A1, published Apr. 8, 2010, filed Sep. 29, 2009, and entitled, "Methods, Apparatus and Systems for Generating Electronic Records of Locate And Marking Operations, and Combined Locate and Marking Apparatus for Same;"

U.S. publication no. 2010-0117654 A1, published May 13, 2010, filed Dec. 30, 2009, and entitled, "Methods and Apparatus for Displaying an Electronic Rendering of a Locate and/or Marking Operation Using Display Layers;"

U.S. publication no. 2010-0086677 A1, published Apr. 8, 2010, filed Aug. 11, 2009, and entitled, "Methods and Apparatus for Generating an Electronic Record of a Marking Operation Including Service-Related Information and Ticket Information;"

U.S. publication no. 2010-0086671 A1, published Apr. 8, 2010, filed Nov. 20, 2009, and entitled, "Methods and Apparatus for Generating an Electronic Record of A Marking Operation Including Service-Related Information and Ticket Information;"

U.S. publication no. 2010-0085376 A1, published Apr. 8, 2010, filed Oct. 28, 2009, and entitled, "Methods and Apparatus for Displaying an Electronic Rendering of a Marking Operation Based on an Electronic Record of Marking Information;"

U.S. publication no. 2010-0088164-A1, published Apr. 8, 2010, filed Sep. 30, 2009, and entitled, "Methods and Apparatus for Analyzing Locate and Marking Operations with Respect to Facilities Maps;"

U.S. publication no. 2010-0088134 A1, published Apr. 8, 2010, filed Oct. 1, 2009, and entitled, "Methods and Apparatus for Analyzing Locate and Marking Operations with Respect to Historical Information;"

U.S. publication no. 2010-0088031 A1, published Apr. 8, 2010, filed Sep. 28, 2009, and entitled, "Methods and Apparatus for Generating an Electronic Record of Environmental Landmarks Based on Marking Device Actuations;"

U.S. publication no. 2010-0188407 A1, published Jul. 29, 2010, filed Feb. 5, 2010, and entitled "Methods and Apparatus for Displaying and Processing Facilities Map Information and/or Other Image Information on a Marking Device;"

U.S. publication no. 2010-0198663 A1, published Aug. 5, 2010, filed Feb. 5, 2010, and entitled "Methods and Apparatus for Overlaying Electronic Marking Information on Facilities Map Information and/or Other Image Information Displayed on a Marking Device;"

U.S. publication no. 2010-0188215 A1, published Jul. 29, 2010, filed Feb. 5, 2010, and entitled "Methods and Apparatus for Generating Alerts on a Marking Device, Based on Comparing Electronic Marking Information to Facilities Map Information and/or Other Image Information;"

U.S. publication no. 2010-0188088 A1, published Jul. 29, 2010, filed Feb. 5, 2010, and entitled "Methods and Apparatus for Displaying and Processing Facilities Map Information and/or Other Image Information on a Locate Device;"

U.S. publication no. 2010-0189312 A1, published Jul. 29, 2010, filed Feb. 5, 2010, and entitled "Methods and Apparatus for Overlaying Electronic Locate Information on Facilities Map Information and/or Other Image Information Displayed on a Locate Device;"

U.S. publication no. 2010-0188216 A1, published Jul. 29, 2010, filed Feb. 5, 2010, and entitled "Methods and Apparatus for Generating Alerts on a Locate Device, Based on Comparing Electronic Locate Information to Facilities Map Information and/or Other Image Information;"

U.S. publication no. 2010-0189887 A1, published Jul. 29, 2010, filed Feb. 11, 2010, and entitled "Marking Apparatus Having Enhanced Features for Underground Facility Marking Operations, and Associated Methods and Systems;"

U.S. publication no. 2010-0188245 A1, published Jul. 29, 2010, filed Feb. 11, 2010, and entitled "Locate Apparatus Having Enhanced Features for Underground Facility Marking operations, and Associated Methods and Systems;"

U.S. publication no. 2009-0204238-A1, published Aug. 13, 2009, filed Feb. 2, 2009, and entitled "Electronically Controlled Marking Apparatus and Methods;"

U.S. publication no. 2009-0208642-A1, published Aug. 20, 2009, filed Feb. 2, 2009, and entitled "Marking Apparatus and Methods For Creating an Electronic Record of Marking Operations;"

U.S. publication no. 2009-0210098-A1, published Aug. 20, 2009, filed Feb. 2, 2009, and entitled "Marking Apparatus and Methods For Creating an Electronic Record of Marking Apparatus Operations;"

U.S. publication no. 2009-0201178-A1, published Aug. 13, 2009, filed Feb. 2, 2009, and entitled "Methods For Evaluating Operation of Marking Apparatus;"

U.S. publication no. 2009-0238417-A1, published Sep. 24, 2009, filed Feb. 6, 2009, and entitled "Virtual White Lines for Indicating Planned Excavation Sites on Electronic Images;"

U.S. publication no. 2010-0205264-A1, published Aug. 12, 2010, filed Feb. 10, 2010, and entitled "Methods, Apparatus, and Systems for Exchanging Information Between Excavators and Other Entities Associated with Underground Facility Locate and Marking Operations;"

U.S. publication no. 2010-0205031-A1, published Aug. 12, 2010, filed Feb. 10, 2010, and entitled "Methods, Apparatus, and Systems for Exchanging Information Between Excavators and Other Entities Associated with Underground Facility Locate and Marking Operations;"

U.S. publication no. 2010-0201706-A1, published Aug. 12, 2010, filed Jun. 1, 2009, and entitled "Virtual White Lines (VWL) for Delimiting Planned Excavation Sites of Staged Excavation Projects;"

U.S. publication no. 2010-0205555-A1, published Aug. 12, 2010, filed Jun. 1, 2009, and entitled "Virtual White Lines (VWL) for Delimiting Planned Excavation Sites of Staged Excavation Projects;"

U.S. publication no. 2010-0205195-A1, published Aug. 12, 2010, filed Jun. 1, 2009, and entitled "Methods and Apparatus for Associating a Virtual White Line (VWL) Image with Corresponding Ticket Information for an Excavation Project;"

U.S. publication no. 2010-0205536-A1, published Aug. 12, 2010, filed Jun. 1, 2009, and entitled "Methods and Apparatus for Controlling Access to a Virtual White Line (VWL) Image for an Excavation Project;"

U.S. publication no. 2010-0228588-A1, published Sep. 9, 2010, filed Feb. 11, 2010, and entitled "Management System, and Associated Methods and Apparatus, for Providing Improved Visibility, Quality Control and Audit Capability for Underground Facility Locate and/or Marking Operations;"

U.S. publication no. 2010-0201690-A1, published Aug. 12, 2010, filed Apr. 13, 2009, and entitled "Virtual White Lines (VWL) Application for Indicating a Planned Excavation or Locate Path;"

U.S. publication no. 2010-0205554-A1, published Aug. 12, 2010, filed Apr. 13, 2009, and entitled "Virtual White Lines (VWL) Application for Indicating an Area of Planned Excavation;"

U.S. publication no. 2009-0202112-A1, published Aug. 13, 2009, filed Feb. 11, 2009, and entitled "Searchable Electronic Records of Underground Facility Locate Marking Operations;"

U.S. publication no. 2009-0204614-A1, published Aug. 13, 2009, filed Feb. 11, 2009, and entitled "Searchable Electronic Records of Underground Facility Locate Marking Operations;"

U.S. publication no. 2010-0205032-A1, published Aug. 12, 2010, filed Feb. 11, 2010, and entitled "Marking Apparatus Equipped with Ticket Processing Software for Facilitating Marking Operations, and Associated Methods;"

U.S. publication no. 2009-0327024-A1, published Dec. 31, 2009, filed Jun. 26, 2009, and entitled "Methods and Apparatus for Quality Assessment of a Field Service Operation;"

U.S. publication no. 2010-0010862-A1, published Jan. 14, 2010, filed Aug. 7, 2009, and entitled, "Methods and Apparatus for Quality Assessment of a Field Service Operation Based on Geographic Information;"

U.S. publication No. 2010-0010863-A1, published Jan. 14, 2010, filed Aug. 7, 2009, and entitled, "Methods and Apparatus for Quality Assessment of a Field Service Operation Based on Multiple Scoring Categories;"

U.S. publication no. 2010-0010882-A1, published Jan. 14, 2010, filed Aug. 7, 2009, and entitled, "Methods and Apparatus for Quality Assessment of a Field Service Operation Based on Dynamic Assessment Parameters;"

U.S. publication no. 2010-0010883-A1, published Jan. 14, 2010, filed Aug. 7, 2009, and entitled, "Methods and Apparatus for Quality Assessment of a Field Service Operation Based on Multiple Quality Assessment Criteria;"

U.S. publication no. 2010-0088135 A1, published Apr. 8, 2010, filed Oct. 1, 2009, and entitled, "Methods and Apparatus for Analyzing Locate and Marking Operations with Respect to Environmental Landmarks;"

U.S. publication no. 2010-0085185 A1, published Apr. 8, 2010, filed Sep. 30, 2009, and entitled, "Methods and Apparatus for Generating Electronic Records of Marking operations;"

U.S. publication no. 2010-0090700-A1, published Apr. 15, 2010, filed Oct. 30, 2009, and entitled "Methods and Apparatus for Displaying an Electronic Rendering of a Marking operation Based on an Electronic Record of Locate Information;" and U.S. publication no. 2010-0085054 A1, published Apr. 8, 2010, filed Sep. 30, 2009, and entitled, "Systems and Methods for Generating Electronic Records of Locate And Marking Operations."

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF THE DRAWINGS

The drawings are not necessarily to scale, emphasis instead generally being placed upon illustrating the principles of the illustrated embodiments. The present invention, together with further objectives and advantages, may be best understood by reference to the following description, taken in connection with the accompanying drawings as set forth below.

DETAILED DESCRIPTION

Figure 1:
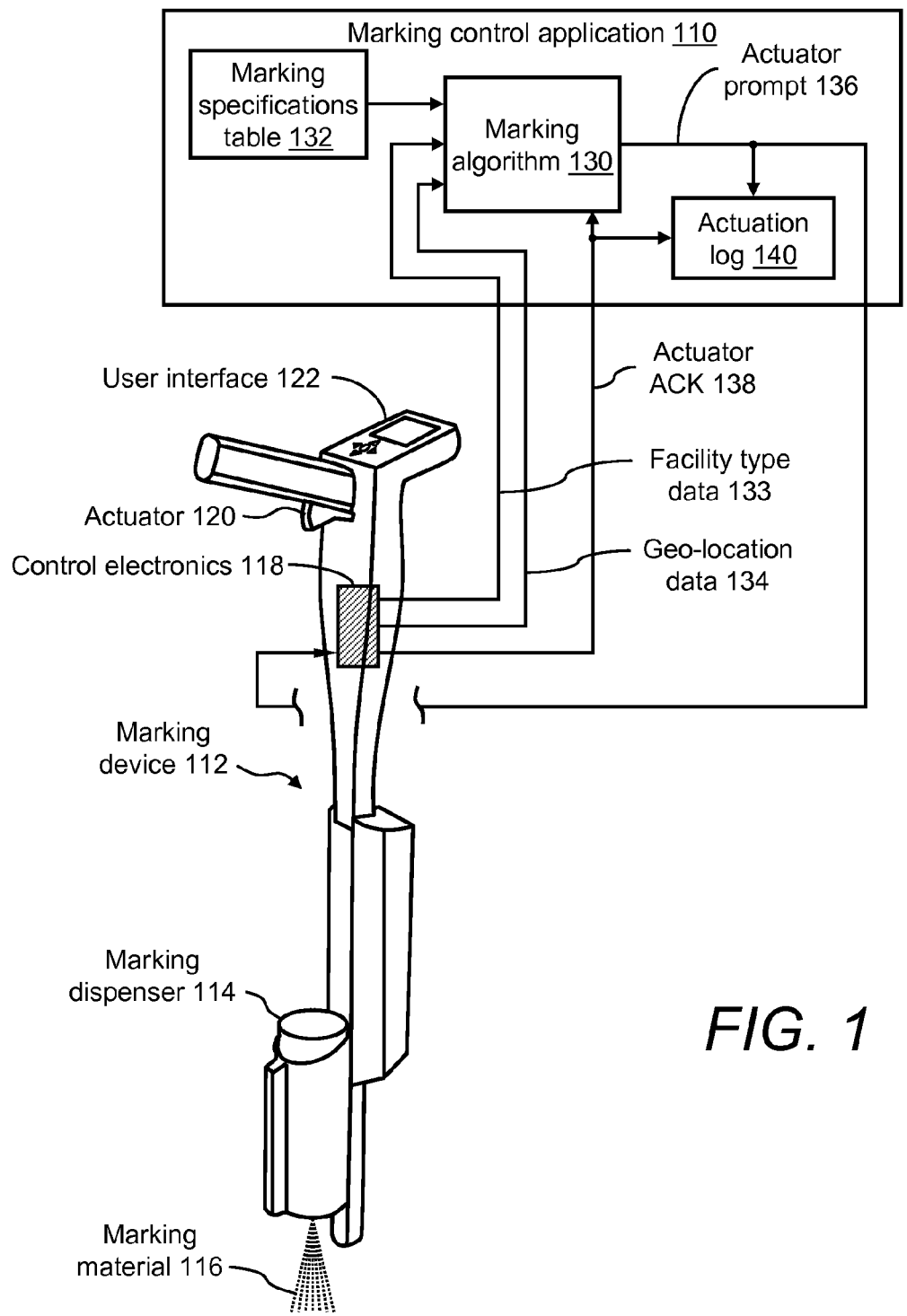
FIG. 1 is a functional block diagram of an example of a marking material control system for facilitating compliance with marking specifications for dispensing marking material in marking operations, according to embodiments of the invention.

Following below are more detailed descriptions of various concepts related to, and embodiments of, inventive methods, apparatus and systems for facilitating compliance with marking specifications for dispensing marking material during marking operations. It should be appreciated that various concepts introduced above and discussed in greater detail below may be implemented in any of numerous ways, as the disclosed concepts are not limited to any particular manner of implementation. Examples of specific implementations and applications are provided primarily for illustrative purposes.

Various government-related and other administrative bodies, as well as facility owners and locate contractors, may define marking specifications. As noted above, exemplary sources of "marking specifications" with which various embodiments of the present invention may facilitate compliance include, but are not limited to: federal, state, or local statutes or regulations relating to one or more aspects of marking ground, pavement or other surfaces in connection with underground facilities; recommendations, guidelines or best practices promulgated by an industry association or organization (e.g., the Common Ground Alliance or CGA, the National Utility Locating Contractors Association or NUCLA) relating to marking operations; locate company, locate contractor, and/or facility owner best practices or standard operating procedures relating to marking operations; and specified contractual obligations for performance of marking operations.

In exemplary inventive embodiments described herein, marking specifications for dispensing marking material in marking operations may include guidelines as to the amount of marking material to dispense. More specifically, in some aspects marking specifications may specify the spacing between marks along the line of facilities being marked. The spacing specification may vary, for example, from one facility type to another. For example, when marking gas lines, the spacing between marks may be specified at about 4 feet; when marking cable TV lines, the spacing between marks may be specified at about 6 feet; when marking electric power lines, the spacing between marks may be specified at about 5 feet; and the like. The spacing specification may also vary from one customer to another. For example, when marking gas lines for one customer, the spacing specification may be 4 feet. However, when marking gas lines for another customer, the spacing specification may be 5 feet. Additionally, the spacing specification may be dependent on the length of the run (i.e., short run vs. long run). For example, when marking a 50-foot line, the spacing between marks may be specified at about 4 feet; however, when marking a 1000-foot line, the spacing between marks may be specified at about 6 feet.

The marking specifications can also define one or more marking patterns to be applied, such as on the ground, pavement or other surface, in and around an excavation work site and/or in one or more dig areas in connection with an underground facility marking operation. The marking patterns may include marking patterns that indicate the presence or absence of an underground facility, marking patterns that indicate the dig area, and any other marking patterns. The marking patterns may include a series of marks, one or more characters, one or more symbols and/or any other marks.

A marking material control system may include a marking control application (e.g., a set of processor-executable instructions executed by one or more processing units) that operates in combination with a geo-enabled marking device or that is installed fully or in part on the geo-enabled marking device. The marking control application may process marking specifications (e.g., information from regulatory bodies) for dispensing marking material in marking operations. For example, marking specifications may include a spacing parameter and a length parameter for each type of facility. The spacing parameter specifies the preferred spacing (e.g., 4 feet) between marks, and the length parameter specifies the preferred length (e.g., 12 inches) of the marks that are dispensed for each type of facility.

Further, the marking control application may process location information from a location tracking system of the marking device. More specifically, the marking control application may generate an actuator prompt with respect to dispensing marking material based on geo-location data and information in the marking specification. The actuator prompt may include a leading prompt for prompting the beginning of the mark and a trailing prompt for prompting the ending of the mark.

For example, based on geo-location data and/or any other means of determining position, when it is determined that the marking device has moved a distance (from the previous actuation) that is equal to or greater than the spacing parameter in the marking specification, a leading prompt may be presented to the user of the marking device to begin dispensing the next mark. In one example, when the spacing parameter is about 6 feet and it is determined that a change in position of the marking device (e.g., based on geo-location data) from the previous actuation is at least 6 feet, a visual message, an audible beep, and/or a vibration in the handle of the marking device may be used to prompt the user of the marking device to begin dispensing the next mark. Further, the marking control application may monitor the length of the mark (based on geo-location data). When it is determined that the length of the mark is about equal to the length parameter in the marking specification, a trailing prompt may be presented to the user of the marking device to stop dispensing marking material. In one example, when the length parameter is about 12 inches and it is determined that a change in position of the marking device (based on geo-location data) from the beginning of the actuation is at least 12 inches, a visual message, an audible beep, and/or a vibration in the handle of the marking device may be used to prompt the user of the marking device to stop dispensing marking material.

Marking specifications are not limited to the spacing and length parameters only, and may include any other parameters. Certain regulations and/or contractual obligations may require, for example, specified symbols and/or alphanumeric characters to be dispensed in a specified manner and/or frequency. Consequently, the marking control application may be programmed to generate other prompts with respect to other parameters of the marking specifications.

In one aspect, the marking material control systems and methods of the present invention are capable of using real-time geo-location data of the marking device to automatically determine the governing regulatory body and then automatically determine the relevant marking specifications for use during locate operations. Additionally, the relevant marking specifications of certain governing regulatory bodies may vary seasonally, with ground conditions and/or type, and/or with environmental conditions. Therefore, the marking material control system may automatically determine the relevant marking specifications based on the time of year, ground conditions and/or type, and/or environmental conditions.

In another aspect, the marking material control systems and methods of the present invention are capable of using the contents of marking specifications of one or more regulatory bodies in combination with real-time facility type data and geo-location data from the marking device to generate a real-time leading prompt to indicate the beginning of the mark, followed by a real-time trailing prompt to indicate the ending of the mark. Further, the marking material control system may generate other prompts with respect to any other parameters of the marking specifications.

In yet another aspect, the marking material control systems and methods of the present invention may rely on the user's response to the leading and trailing prompts to ensure regulatory compliance with respect to dispensing marking material in locate operations and/or to avoid over spraying and/or under spraying of marking material.

In yet another aspect, the marking device may be enabled only between the leading prompt and the trailing prompt, thereby preventing marking material from being dispensed when the operation is not in compliance with the information in the marking specifications.

In still another aspect, marking material may be dispensed automatically by the marking device based on the leading prompts and the trailing prompts, without user action. In this aspect of the present invention, the marking material control system and methods are not dependent on manual responses of users to prompts to ensure regulatory compliance and/or to avoid over spraying marking material.

FIG. 1 is a functional block diagram of an example of a marking material control system 100 for facilitating compliance with marking specifications for dispensing marking material in marking operations. Marking material control system 100 may include a marking control application 110 and a marking device 112 in which a marking dispenser 114 is installed for dispensing marking material 116. The marking material may be any material, substance, compound, and/or element which may be used separately or in combination to mark, signify, and/or indicate the presence or absence of a facility. Examples of marking materials may include, but are not limited to, paint, chalk, dye, and/or marking powder such as iron.

Marking device 112 may be an electronic geo-enabled marking device, that has control electronics 118 (see FIG. 2) which may include a location tracking system. As discussed in greater detail below, examples of a location tracking system may include, but are not limited to, a global positioning system (GPS), other instrumentation including one or more accelerometers and one or more compasses to facilitate determination of relative geographic position, various components of a triangulation system to facilitate determination of geographic location, and combinations of the foregoing. Exemplary details of a marking device that may be suitable for purposes of various embodiments of the present invention and serve as the marking device 112 are described in U.S. Patent Publication No. 2008/0245299, entitled "Marking system and method"; U.S. Patent Publication No. 2009/0013928, entitled "Marking system and method"; U.S. Pat. No. 7,640,105, issued Dec. 29, 2009, filed Mar. 13, 2007, and entitled "Marking System and Method With Location and/or Time Tracking;" and U.S. publication no. 2010-0189887 A1, published Jul. 29, 2010, filed Feb. 11, 2010, and entitled "Marking Apparatus Having Enhanced Features for Underground Facility Marking Operations, and Associated Methods and Systems," as well as marking devices having various features according to other U.S. patent application publications incorporated by reference herein.

Control electronics 118 manages the overall operations of marking device 112 and, in particular, is capable of processing instructions and/or information in connection with functionality implemented by the marking control application 110. Marking device 112 further includes an actuator 120, which may be an electrical/mechanical actuator for activating the marking material spray action of marking dispenser 114, and a user interface 122. The components of marking device 112 are described in greater detail below in connection with FIG. 2.

Marking control application 110 may process various information, such as marking specifications, location information, and actuation information, in connection with marking operations. For example, a marking algorithm 130 of marking control application 110 may be a software algorithm for facilitating compliance with marking specifications for dispensing marking material in marking operations and/or to avoid over spraying marking material. More specifically, marking algorithm 130 may be a set of processor-executable instructions stored in memory that, when executed by one or more processing units, implement various functionality associated with the marking control application 110, which may include reading information from a marking specifications table 132 (e.g., also stored in memory). As noted above, various types of marking specifications may be included in such a table; for example, the contents of marking specifications table 132 may include federal, regional, state, and/or local marking regulations; locate company-specific marking regulations; other controlling entities-specific marking regulations (e.g., CGA-specific and NULCA-specific marking regulations); and any combinations thereof. In one example, each set of marking specifications in marking specifications table 132 may include a spacing parameter (e.g., 4 feet) and a length parameter (e.g., 12 inches) for each facility type, which provides a guideline as to the preferred amount of marking material to be dispensed for each facility type during marking operations.

Examples of marking specifications of multiple regulatory bodies that may be included in marking specifications table 132 are shown in Tables 1, 2, and 3 below.

TABLE 1

Example contents of marking specifications table 132
First federal, regional, state, and/or local regulatory body

| Facility Type | Specification | Value |
|---|---|---|
| Proposed excavation | Spacing parameter | 6 feet |
| | Length parameter | 12 inches |
| Temporary survey markings | Spacing parameter | 4 feet |
| | Length parameter | 12 inches |
| Electric power lines, cables or conduits, lighting cables | Spacing parameter | 4 feet |
| | Length parameter | 12 inches |
| Gas, oil, steam, petroleum, or other hazardous liquid or gaseous materials | Spacing parameter | 3 feet |
| | Length parameter | 12 inches |
| Communications, cable TV, alarm or signal lines, cables, or conduits | Spacing parameter | 4 feet |
| | Length parameter | 12 inches |
| Water, irrigation, and slurry lines | Spacing parameter | 5 feet |
| | Length parameter | 12 inches |
| Reclaimed water, irrigation and slurry lines | Spacing parameter | 5 feet |
| | Length parameter | 12 inches |
| Sewers, storm sewer facilities, or other drain lines | Spacing parameter | 5 feet |
| | Length parameter | 12 inches |
| Runs of ≤100 feet (any facility type) | Spacing parameter | Value (x1.0) |
| | Length parameter | Value (x1.0) |
| Runs of >100 feet (any facility type) | Spacing parameter | Value (x1.5) |
| | Length parameter | Value (x1.0) |

TABLE 2

Example contents of marking specifications table 132
Second federal, regional, state, and/or local regulatory body

| Facility Type | Specification | Value |
|---|---|---|
| All facility types | Spacing parameter | 4 feet |
| | Length parameter | 12 inches |
| Runs of ≤100 feet (any facility type) | Spacing parameter | Value (x1.0) |
| | Length parameter | Value (x1.0) |
| Runs of >100 feet (any facility type) | Spacing parameter | Value (x1.5) |
| | Length parameter | Value (x1.0) |

TABLE 3

Example contents of marking specifications table 132
Third federal, regional, state, and/or local regulatory body

| Facility Type | Specification | Value |
|---|---|---|
| Proposed excavation | Spacing parameter | 4 feet |
| | Length parameter | 18 inches |
| Temporary survey markings | Spacing parameter | 4 feet |
| | Length parameter | 18 inches |
| Electric power lines, cables or conduits, lighting cables | Spacing parameter | 5 feet |
| | Length parameter | 18 inches |
| Gas, oil, steam, petroleum, or other hazardous liquid or gaseous materials | Spacing parameter | 4 feet |
| | Length parameter | 18 inches |
| Communications, cable TV, alarm or signal lines, cables, or conduits | Spacing parameter | 5 feet |
| | Length parameter | 18 inches |

TABLE 3-continued

Example contents of marking specifications table 132
Third federal, regional, state, and/or local regulatory body

| Facility Type | Specification | Value |
|---|---|---|
| Water, irrigation, and slurry lines | Spacing parameter | 6 feet |
| | Length parameter | 18 inches |
| Reclaimed water, irrigation and slurry lines | Spacing parameter | 6 feet |
| | Length parameter | 18 inches |
| Sewers, storm sewer facilities, or other drain lines | Spacing parameter | 6 feet |
| | Length parameter | 18 inches |
| Runs of ≤100 feet (any facility type) | Spacing parameter | Value (x1.0) |
| | Length parameter | Value (x1.0) |
| Runs of >100 feet (any facility type) | Spacing parameter | Value (x1.5) |
| | Length parameter | Value (x1.0) |

With respect to the facility types that are specified in marking specifications table 132 (e.g., see Tables 1, 2, and 3), information about the type of facility being marked may be provided to marking control application 110 by one or more elements of control electronics 118 (see FIG. 2) of marking device 112. In one example, facility type data 133 of marking device 112 may be communicated to marking control application 110. Mechanisms for providing facility type data 133 are described with reference to FIG. 2.

Marking algorithm 130 may process geo-location data 134 from the location tracking system of control electronics 118 (see FIG. 2) of marking device 112. Mechanisms for providing geo-location data 134 are described with reference to FIG. 2. More specifically, marking algorithm 130 of marking control application 110 may generate an actuator prompt 136, which is a prompt to dispense marking material 116 based on interpreting geo-location data 134 in the context of the information in marking specifications table 132. For example, based on interrogating geo-location data 134, when it is determined that the distance moved by marking device 112 is equal to or greater than the distance in the spacing parameter in marking specifications table 132, a visual, audible, and/or tactile prompt may be generated to prompt the user of marking device 112 to dispense marking material. In one example, when the spacing parameter is about 6 feet and it is determined that a change in position of marking device 112 (based on geo-location data 134) from the previous actuation is at least 6 feet, an actuator prompt 136 is generated (e.g., a visual message, an audible beep, and/or a vibration in the handle of marking device 112) to prompt the user of marking device 112 to dispense marking material 116. Upon sensing the activation of actuator 120, control electronics 118 of marking device 112 returns an actuator acknowledge (ACK) 138 to marking control application 110.

Marking algorithm 130 of marking control application 110 may monitor the length of the mark (based on geo-location data 134). When it is determined that the length of the mark is about equal to the length parameter in marking specifications table 132, a visual, audible, and/or tactile prompt may be generated to prompt the user of marking device 112 to stop dispensing marking material 116. In one example, when the length parameter is 12 inches and it is determined that the length of the mark is about equal to 12 inches (based on geo-location data 134), an actuator prompt 136 is generated to prompt the user of marking device 112 to stop dispensing marking material 116. Upon sensing the deactivation of actuator 120, control electronics 118 of marking device 112 again returns an actuator ACK 138 to marking control application 110. An actuation log 140 stores each actuator prompt 136 and its associated actuator ACK 138. In one example, each entry in actuation log 140 may include actuator prompt 136, actuator ACK 138, timestamp information (e.g., current date and time), current status of actuator 120, current facility type data 133, and current geo-location data 134.

In one embodiment, marking material control system 100 may be configured such that marking control application 110 is implemented in a separate apparatus or computer system (e.g., including one or more processing units communicatively coupled to memory and one or more communication interfaces) that operates in combination with the geo-enabled marking device 112. In another embodiment, the marking control application 110 may be installed fully or in part on marking device 112 (e.g., in memory of the marking device). For example, in one implementation, marking control application 110 may be installed on a computing device (not shown) separate from marking device 112, wherein the separate computing device is in communication with marking device 112. In another implementation, the functionality and/or components of marking control application 110 may be installed fully or in part on the combination of a separate computing device and marking device 112. In yet another implementation, marking control application 110 may be installed on marking device 112 (e.g., stored in memory of the marking device, and executed by one or more processing units disposed in or mechanically coupled to the marking device). In this implementation, marking material control system 100 is implemented substantially entirely within marking device 112. An example of marking material control system 100 implemented substantially within marking device 112 is shown in FIG. 2.

Figure 2:
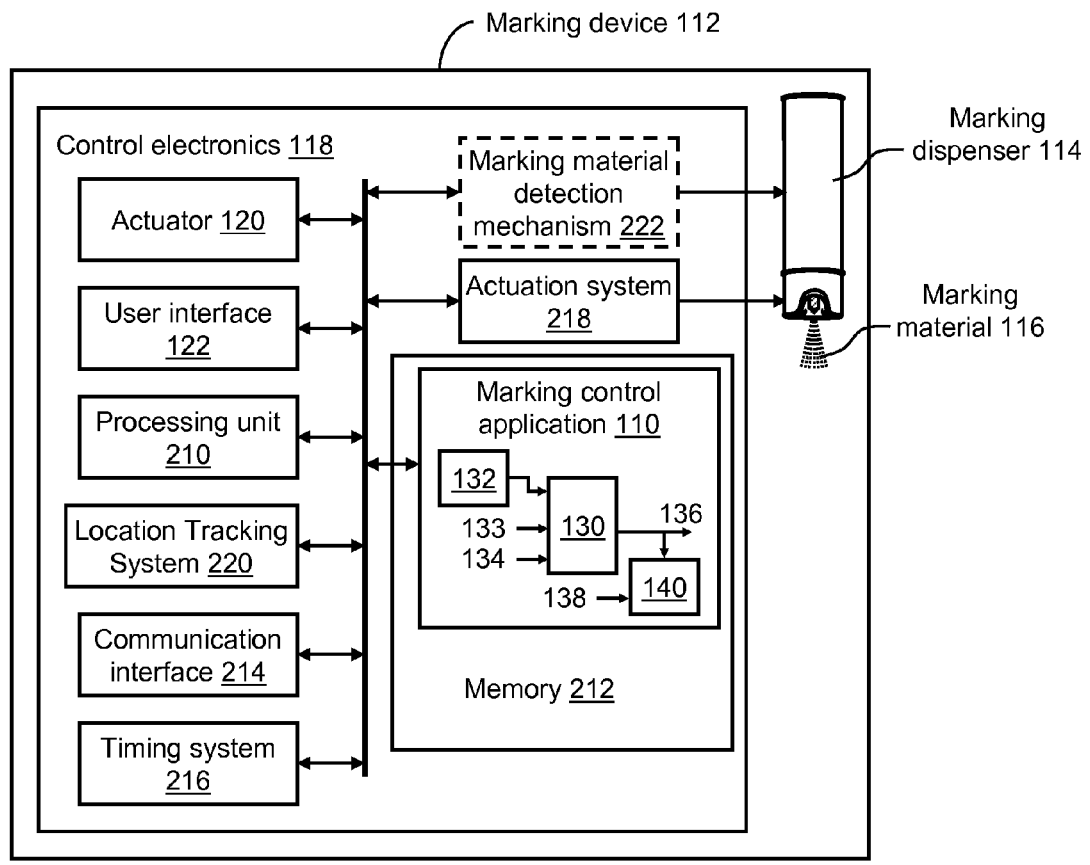
FIG. 2 is a functional block diagram of an example of a marking device that includes the marking material control system of FIG. 1 integrated therein, according to embodiments of the invention.

FIG. 2 is a functional block diagram of an example of a marking device, such as marking device 112, that has marking material control system 100 integrated therein, according to one embodiment of the present invention. In this example, marking material control system 100 includes marking device 112 in which marking control application 110 is "installed" (e.g., resident in memory 212) and executing (e.g., via processing unit 210).

More specifically, FIG. 2 shows that control electronics 118 of marking device 112 may include, for example, user interface 122 of FIG. 1, a processing unit 210, a memory 212, a communication interface 214, a timing system 216, an actuation system 218 fed by actuator 120 of FIG. 1, a location tracking system 220, and optionally a marking material detection mechanism 222.

Processing unit 210 may be any standard controller or microprocessor device capable of executing program instructions, such as those from marking control application 110. Memory 212 may be any data storage mechanism for storing any information processed locally at marking device 112. Processing unit 210 and memory 212 may be used for managing the overall operations of marking device 112, and implementing the marking control application 110.

User interface 122 of marking device 112 may include any mechanism or combination of mechanisms by which the user may operate the device and by which information processed by the device may be presented to the user. For example, user interface 122 may include, but is not limited to, a display, a ruggedized touch panel, one or more manual pushbuttons, one or more toggle switches, a keypad, an audio speaker, an audible buzzer or alert mechanism, a speaker, a tactile communication mechanism (e.g., a vibration mechanism in the handle of marking device 112) and any combinations thereof. In one example, actuator prompts 136 may be presented to the user as text messages via the display of user interface 122 of marking device 112. In another example, actuator prompts 136 may be presented to the user as audible sounds via the audible buzzer and/or speaker of user interface 122 of marking device 112. In another example, actuator prompts 136 may be presented to the user as vibrations in the handle of marking device 112. In yet another example, actuator prompts 136 may be presented to the user in any combinations of the aforementioned. Additionally, a touch panel, pushbuttons, and/or keypad of user interface 122 of marking device 112 may be used by the user to enter, for example, the type of facility being marked.

Communication interface 214 may be any wired and/or wireless communication interface for connecting to a network (not shown) and by which information may be exchanged with other computing devices separate from marking device 112. Examples of wired communication interfaces may include, but are not limited to, USB ports, RS232 connectors, RJ45 connectors, Ethernet, and any combinations thereof. Examples of wireless communication interfaces may include, but are not limited to, an Intranet connection, Internet, Bluetooth® technology, Wi-Fi, Wi-Max, IEEE 802.11 technology, radio frequency (RF), Infrared Data Association (IrDA) compatible protocols, Local Area Networks (LAN), Wide Area Networks (WAN), Shared Wireless Access Protocol (SWAP), any combinations thereof, and other types of wireless networking protocols.

Timing system 216 may include an internal clock (not shown), such as a crystal oscillator device, of control electronics 118 of marking device 112. Additionally, timing system 216 may include a mechanism for registering time with a specified degree of accuracy (e.g., accuracy to the minute, second, or millisecond). Timing system 216 may also include a mechanism for registering the calendar date. In one embodiment, timing system 216 may be capable of registering the time and date using its internal clock. In another embodiment, timing system 216 may receive time and date information from location tracking system 220 (e.g., a GPS). In yet another embodiment, timing system 216 may receive time and date information from an external timing system, such as a remote computer or network. Using timing system 216, a timestamp may be appended to any information processed by marking material control system 100.

Actuation system 218 of marking device 112 may operate in combination with or include a mechanical and/or electrical actuator mechanism, such as actuator 120, coupled to an actuator that causes, for example, marking material 116 to be dispensed from marking dispenser 114. Actuation means starting or causing any device (e.g., marking device 112), program, system, and/or any combination thereof to work, operate, and/or function. Examples of actuation may include, but are not limited to, any local or remote, physical, audible, inaudible, visual, non-visual, electronic, electromechanical, biomechanical, biosensing or other signal, instruction, or event. Actuations of marking device 112 may be performed for any purpose, such as, but not limited to, for dispensing marking material and for capturing any information of any component of marking device 112 without dispensing marking material. Actuation system 218 may generate actuator ACK 138, which is returned to marking control application 110 in response to actuator prompt 136. Processing unit 210 may be programmed to enable and disable actuation system 218 of marking device 112 based on instructions from marking control application 110.

Location tracking system 220 of marking device 112 may include any device that can determine its geographical location to a specified degree of accuracy. For example, location tracking system 220 may include a GPS receiver or a global navigation satellite system (GNSS) receiver. A GPS receiver may provide, for example, any standard format data stream, such as a National Marine Electronics Association (NMEA)

data stream. Preferably, location tracking system 220 is physically installed near the tip of marking device 112 close to marking dispenser 114. In one example, location tracking system 220 is the source of geo-location data 134, referenced in FIG. 1.

Additionally, location tracking system 220 may include an error correction component (not shown) for improving the accuracy of the geo-location data. The error correction component may be any mechanism for improving the accuracy of the geo-location data of location tracking system 220. In one example, the error correction component may be an algorithm for correcting any offsets (e.g., due to local disturbances in the atmosphere) in the geo-location data of location tracking system 220.

In some embodiments, location tracking system 220 may include a device or mechanism that determines location by any other means, such as performing triangulation by use of cellular radiotelephone towers.

In some embodiments, location tracking system 220 may include a GPS receiver and sensors for tracking the current location of marking device 112 relative to a reference GPS location. In particular, one or more accelerometers (e.g., a three-axis accelerometer) may be included in the marking device 112 (e.g., mounted at or near the tip of marking device 112), and a compass may be affixed to marking device 112. The accelerometer outputs acceleration data for each of the three axes. The acceleration data can be processed to provide velocity data and relative orientation. The compass can be used to determine the absolute direction of movement of marking device 112. Thus, the location of the marking device relative to the reference GPS location is determined from the accelerometer and the compass. The reference GPS location can be updated at desired intervals. This approach, known as a dead reckoning system, is described by L. Fang et al. in "Design of a Wireless Assisted Pedestrian Dead Reckoning System—The NavMote Experience", IEEE Transactions on Instrumentation and Measurement, Vol. 54, No. 6, December 2005, pages 2342-2385, which is hereby incorporated by reference. Exemplary implementations employing one or more accelerometers, compasses and implementing dead reckoning techniques for location/position determination are discussed in greater detail in U.S. publication no. 2010-0189887 A1, published Jul. 29, 2010, filed Feb. 11, 2010, and entitled "Marking Apparatus Having Enhanced Features for Underground Facility Marking Operations, and Associated Methods and Systems," and U.S. non-provisional application Ser. No. 12/855,977, filed on Aug. 13, 2010, entitled "Methods and Apparatus for Assessing Marking Operations based on Acceleration Information," which publication and application are incorporated by reference herein in their entirety.

In yet another embodiment, location tracking system 220 may not reside locally on marking device 112. Instead, location tracking system 220 may reside on an on-site computing device (not shown), which serves as a location reference point, to which the location of marking device 112 may be correlated by any other means, such as, but not limited to, by a triangulation technique between the on-site computer and marking device 112.

In exemplary implementations, location tracking system 220 of marking device 112 and/or any other mechanism for determining the location of marking device 112 is suitably accurate (e.g., within a few inches) to provide sufficiently accurate distance measurements with respect to the movement of marking device 112. Alternatively, the movement and/or position of marking device 112 may be determined by an external device in communication with marking device 112 via communication interface 214. For example, any external distance measuring device and/or position sensing mechanism may supply information to marking control application 110 of marking device 112, which may be used in place of and/or in combination with geo-location data 134. An example of an external distance measuring device that may be in communication with marking device 112 is a pedometer.

Readings from location tracking system 220 may be the source of geo-location data 134 feeding marking algorithm 130 of marking control application 110. In one example, geo-location data 134 from location tracking system 220 may be used in locate marking material control system 100 to determine the location of marking device 112 in real time. In another example, geo-location data 134 from location tracking system 220 may be used to correlate the geographic location of marking device 112 to the marking specifications in marking specifications table 132 of the regulatory body that has jurisdiction over the job site.

During marking operations, the user of marking device 112 may manually enter the type of facility being marked via user interface 122 and, thereby, generate facility type data 133. However, because, the color of marking material 116 depends on the type of facility being marked, another way to determine the type of facility is to determine the color of marking material 116 and then correlate the color information to facility type. Table 4 below shows an example of the correlation of marking material color to the type of facility to be marked.

TABLE 4

Correlation of color to facility type

| Marking material color | Facility Type |
| --- | --- |
| White | Proposed excavation |
| Pink | Temporary survey markings |
| Red | Electric power lines, cables or conduits, and lighting cables |
| Yellow | Gas, oil, steam, petroleum, or other hazardous liquid or gaseous materials |
| Orange | Communications, cable TV, alarm or signal lines, cables, or conduits |
| Blue | Water, irrigation, and slurry lines |
| Purple | Reclaimed water, irrigation and slurry lines |
| Green | Sewers, storm sewer facilities, or other drain lines |
| Black | Mark-out for errant lines |

Therefore, optionally, marking material detection mechanism 222 may be used to determine the color of marking material 116 that is being dispensed. Once the color of marking material 116 is determined, the color may be correlated to the type of facility being marked according, for example, to Table 4. This information may then be included in facility type data 133.

Marking material detection mechanism 222 may be any mechanism for determining attributes of marking material 116 within marking dispenser 114 installed in marking device 112. In one embodiment, marking material detection mechanism 222 may include radio-frequency identification (RFID) technology for reading information of an RFID tag that is provided on the marking dispenser. The type of information that may be encoded within the RFID tag on the marking dispenser may include, but is not limited to, product-specific information, user-specific information, and/or other predetermined information of interest. In one example, the RFID tag may include the brand and color of the marking material in the marking dispenser. In this example, marking material detection mechanism 222 is an RFID reader installed in close proximity to the RFID tag on the marking dispenser. In other embodiments, a barcode may be provided on the marking dispenser, and the marking material detection mechanism 222 may include a barcode reader to read marking material information contained in the barcode.

In other embodiments, marking material detection mechanism 222 may be, but is not limited to, an optical sensor, an olfactory sensor, a weight sensor, a switch device, and any combinations thereof. In some embodiments, an optical sensor is used in the marking device for identifying the composition and/or type of marking material in the marking dispenser.

The operation of marking material control system 100 is described with reference to FIGS. 3, 4, 5A, and 5B.

Figure 3:
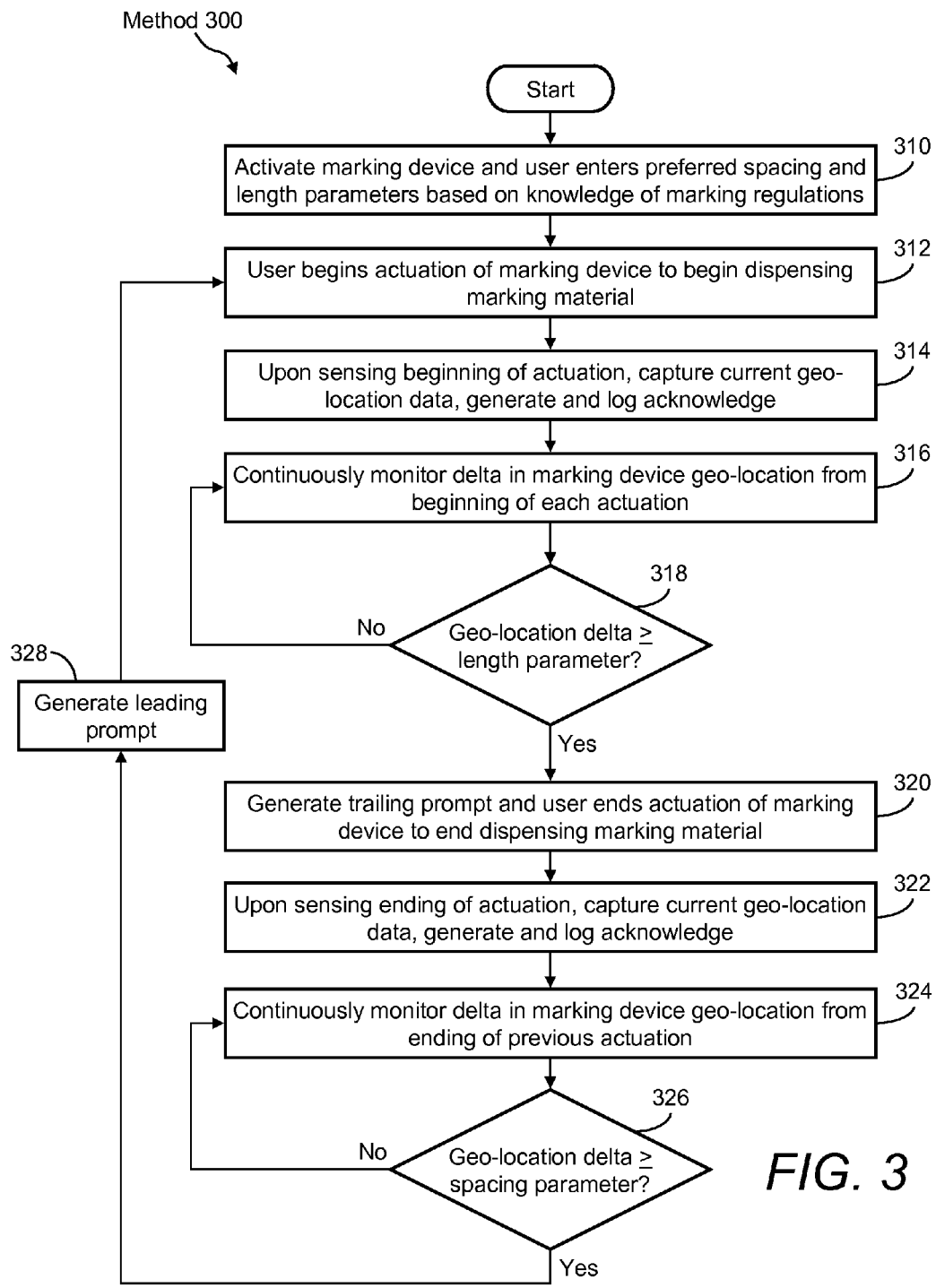
FIG. 3 is a flow diagram of an example of a substantially manual method of operation of a marking device that has the marking material control system integrated therein, according to embodiments of the invention.

FIG. 3 is a flow diagram of a method 300, which is an example of a method of operation of marking device 112 of FIG. 2 having marking material control system 100 integrated therein. In particular, method 300 is an example of a method of operation that uses a combination of manual and automated operations. Method 300 may include, but is not limited to, the following acts, which may be implemented in any order.

Figure 4:
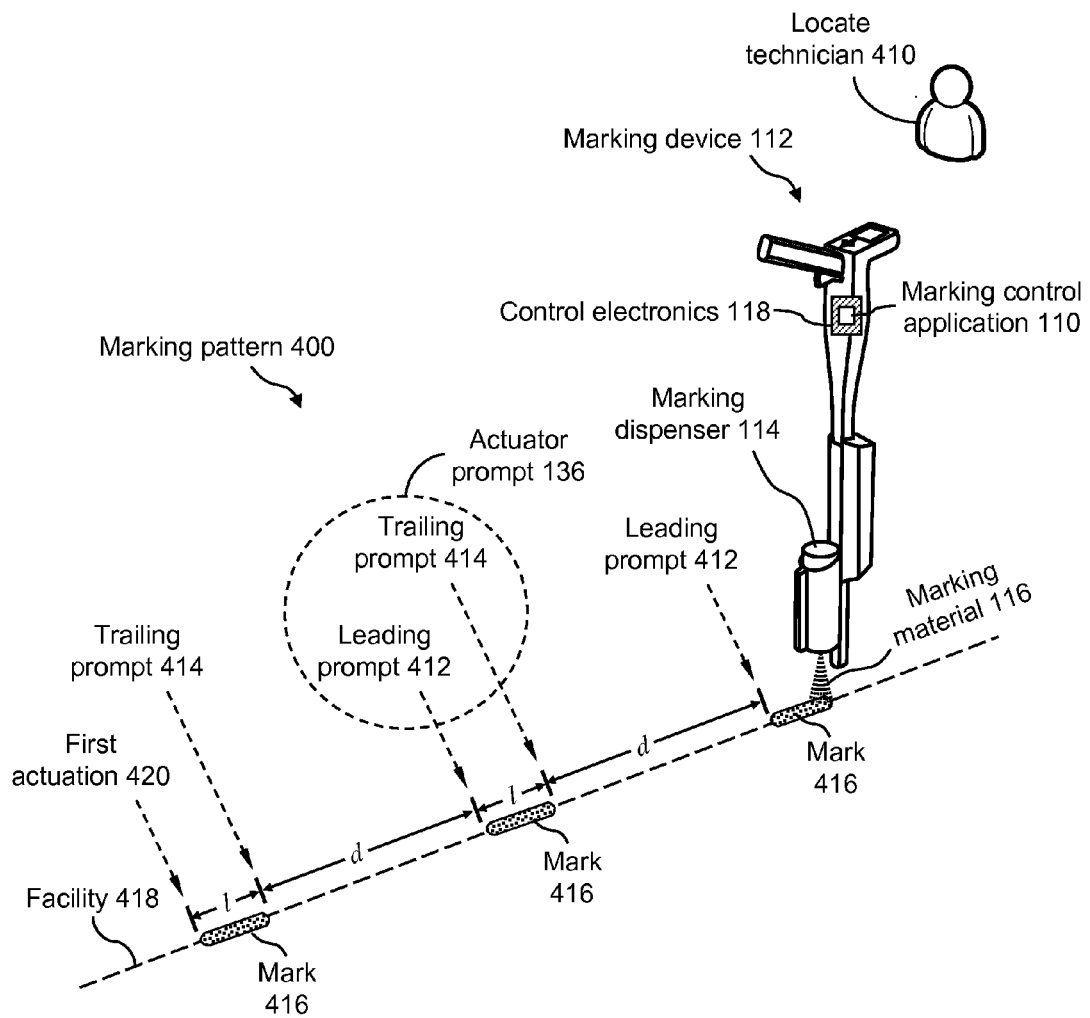
FIG. 4 is a perspective view of an example of a marking pattern being dispensed by use of a marking device that has the marking material control system integrated therein, according to embodiments of the invention.

In act 310, the marking device is activated and the user enters the preferred spacing and length parameters based on knowledge of the marking specifications. For example and referring to FIG. 4, a user, such as a locate technician 410, activates marking device 112. FIG. 4 shows a perspective view of a marking pattern 400 being dispensed by use of marking device 112 of FIG. 2 having marking material control system 100 integrated therein.

After activating marking device 112 and having knowledge of the marking specifications (e.g., of the governing regulatory body for the location of the job site and/or knowledge of locate company contractual obligations), locate technician 410 uses user interface 122 of marking device 112 to enter the spacing and length parameters according to the marking specifications. In one example, using user interface 122, locate technician 410 accesses marking control application 110 that resides locally on marking device 112 and enters a length parameter of 12 inches and a spacing parameter of 4 feet. Once entered, these parameters are now available for use by marking algorithm 130 of marking control application 110 during marking operations. The user's knowledge of the relevant marking specifications may be acquired by manually interrogating marking specifications table 132 of marking control application 110 and/or by interrogating any other source for this information.

In act 312, the user begins actuation of the marking device to begin dispensing marking material. The marking device is positioned by the user at the location of an underground facility as indicated by information from a locate receiver or other location information. The location information indicates the location and path of the underground facility. Referring to FIG. 4, the user, such as locate technician 410, uses actuator 120 of marking device 112 to begin dispensing marking material 116 to form the first mark 416 of marking pattern 400. The first actuation 420 of marking device 112 is based on the determined location of facility 418. The marking control application 110 does not generate a leading prompt at the beginning of the first mark, since the location of facility 418 is not known by marking control application 110. Subsequent actuations are based on leading prompts 412 as described below.

In act 314, upon sensing the beginning of the actuation of marking device 112, the current geo-location data 134 from location tracking system 220 of marking device 112 is captured by marking algorithm 130 of marking control application 110. Additionally, actuation system 218 generates actuator ACK 138 upon sensing the beginning of the actuation of marking device 112, which is returned to marking control application 110. For the first mark 416 of marking pattern 400, a record of first actuation 420 and associated actuator ACK 138 may be stored in actuation log 140. For subsequent marks 416 of marking pattern 400, a record of leading prompt 412 and its associated actuator ACK 138 may be stored in actuation log 140. In one example, each entry in actuation log 140 may include first actuation 420 or leading prompt 412, actuator ACK 138, timestamp information from timing system 216, current status of actuator 120 from actuation system 128, current facility type data 133 as entered in step 310, and current geo-location data 134 from location tracking system 220.

In act 316, marking algorithm 130 of marking control application 110 continuously monitors any change in the geo-location of marking device 112 from the beginning of each actuation. For example, marking algorithm 130 continuously compares the current geo-location data 134 from location tracking system 220 of marking device 112 to the geo-location data 134 at the beginning of the actuation and, thereby, determines the change in the geographic position of marking device 112. The change in position of marking device 112 from one point in time to a next point in time is hereafter referred to as the "geo-location delta" of the marking device.

In act 318, marking algorithm 130 of marking control application 110 determines whether the geo-location delta of marking device 112 is equal to or greater than, or within a predetermined range of, the length parameter entered in act 310 (e.g., 12 inches). Referring again to FIG. 4, the length parameter is indicated as a length l along each mark 416. If yes, method 300 may proceed, for example, to act 320. If no, method 300 may return, for example, to act 316.

In act 320, a trailing prompt is generated and the user ends actuation of the marking device to end dispensing marking material. For example and referring again to FIG. 4, the actuator prompts 136 generated by marking algorithm 130 may include leading prompt 412 and trailing prompt 414. Trailing prompt 414 may be a prompt that is presented to locate technician 410 via marking device 112 for prompting locate technician 410 to end dispensing marking material 116 when forming, for example, marks 416. For example, trailing prompt 414 may be presented to locate technician 410 as a text message via the display of user interface 122 of marking device 112, as an audible sound via the audible buzzer and/or speaker of user interface 122, as a vibration in the handle of marking device 112, and any combinations thereof. In the case of an audible sound, the tone, volume, and/or duration of the audible sound of trailing prompts 414 may differ from the tone, volume, and/or duration of leading prompts 412, so that the locate technician 410 may differentiate between a leading and trailing prompt. In the case of a vibration, the vibration rate and/or vibration duration of trailing prompts 414 may differ from the vibration rate and/or vibration duration of leading prompts 412. Upon receiving trailing prompt 414, locate technician 410 releases actuator 120 of marking device 112 to end dispensing marking material 116 when forming mark 416.

In act 322, upon sensing the ending of the actuation of marking device 112, the current geo-location data 134 from location tracking system 220 of marking device 112 is captured by marking algorithm 130 of marking control application 110. Additionally, actuation system 218 generates actuator ACK 138 upon sensing the ending of the actuation of marking device 112, which is returned to marking control application 110. A record of trailing prompt 414, its associated actuator ACK 138 and the additional data described above may be stored in actuation log 140.

In act 324, marking algorithm 130 of marking control application 110 continuously monitors any change in the geo-location of marking device 112 from the ending of the previous actuation, where the ending of the previous actuation was the result of trailing prompt 414. For example, marking algorithm 130 continuously compares the current geo-location data 134 from location tracking system 220 of marking device 112 to the geo-location data 134 at the ending of the previous actuation and determines the geo-location delta therebetween.

In act 326, marking algorithm 130 of marking control application 110 determines whether the geo-location delta of marking device 112 is equal to or greater than, or within a predetermined range of, the spacing parameter entered in act 310 (e.g., 4 feet). Referring again to FIG. 4, the spacing parameter may be indicated as a distance d between marks 416. If yes, method 300 may proceed, for example, to act 328. If no, method 300 may return, for example, to act 324.

In act 328, a leading prompt is generated. Referring again to FIG. 4, leading prompt 412 may be presented to locate technician 410 via marking device 112 for the purpose of prompting locate technician 410 to begin dispensing marking material 116 for forming, for example, marks 416 to indicate underground facilities. For example, leading prompt 412 may be presented to locate technician 410 as a text message via the display of user interface 122 of marking device 112, as an audible sound via the audible buzzer and/or speaker of user interface 122, as a vibration in the handle of marking device 112, and any combinations thereof. Upon receiving leading prompt 412, locate technician 410 uses actuator 120 of marking device 112 to begin dispensing marking material 116 to form the next mark 416. The leading prompt 412 is generated for each mark 416 in marking pattern 400 after the first mark. Method 300 then returns to act 312.

Referring again to FIGS. 3 and 4, as a result of multiple iterations of method 300, marks 416 of marking pattern 400 are dispensed along the path of facility 418 by use of marking material control system 110 when implemented substantially within a marking device, such as marking device 112.

Referring again to FIGS. 3 and 4, optionally during method 300, actuation system 218 of marking device 112 may be automatically disabled by marking control application 110 between trailing prompt 414 and leading prompt 412 to facilitate compliance with marking specification for dispensing marking material as well as to facilitate conservation of marking material.

Referring again to FIGS. 3 and 4, the generation of trailing prompts, such as trailing prompts 414 of FIG. 4, may be optional in method 300. Alternatively, only leading prompts, such as leading prompts 412 of FIG. 4, are generated and the ending of marks 416 is left up to the manual control of locate technicians 410. Preferably, locate technicians 410 are performing marking operations with knowledge of the marking specifications and may remain substantially compliant with the length parameter thereof, even without trailing prompts.

Figure 5A:
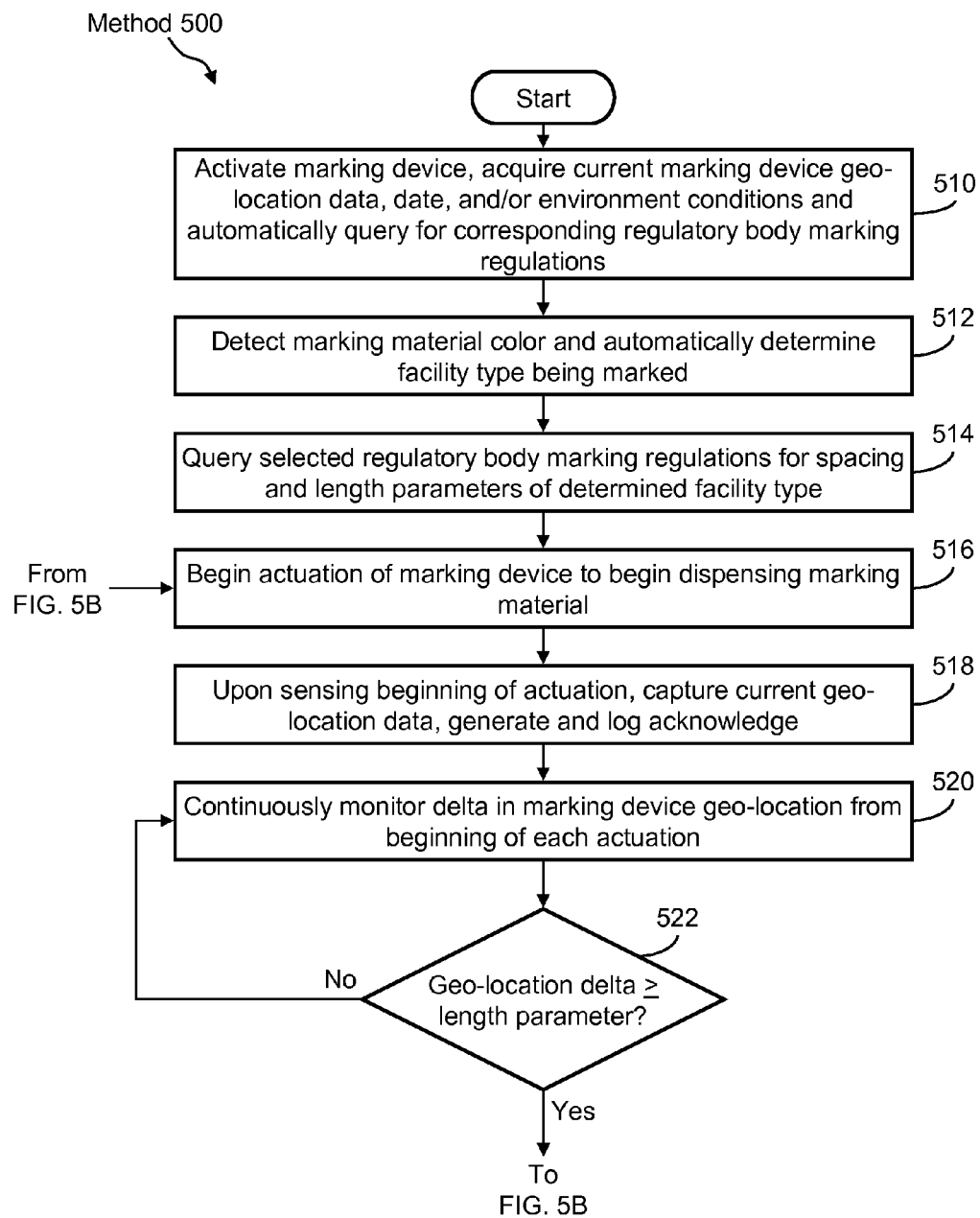
FIGS. 5A and 5B illustrate a flow diagram of an example of a substantially automated method of operation of a marking device that has the marking material control system integrated therein, according to embodiments of the invention.
Figure 5B:
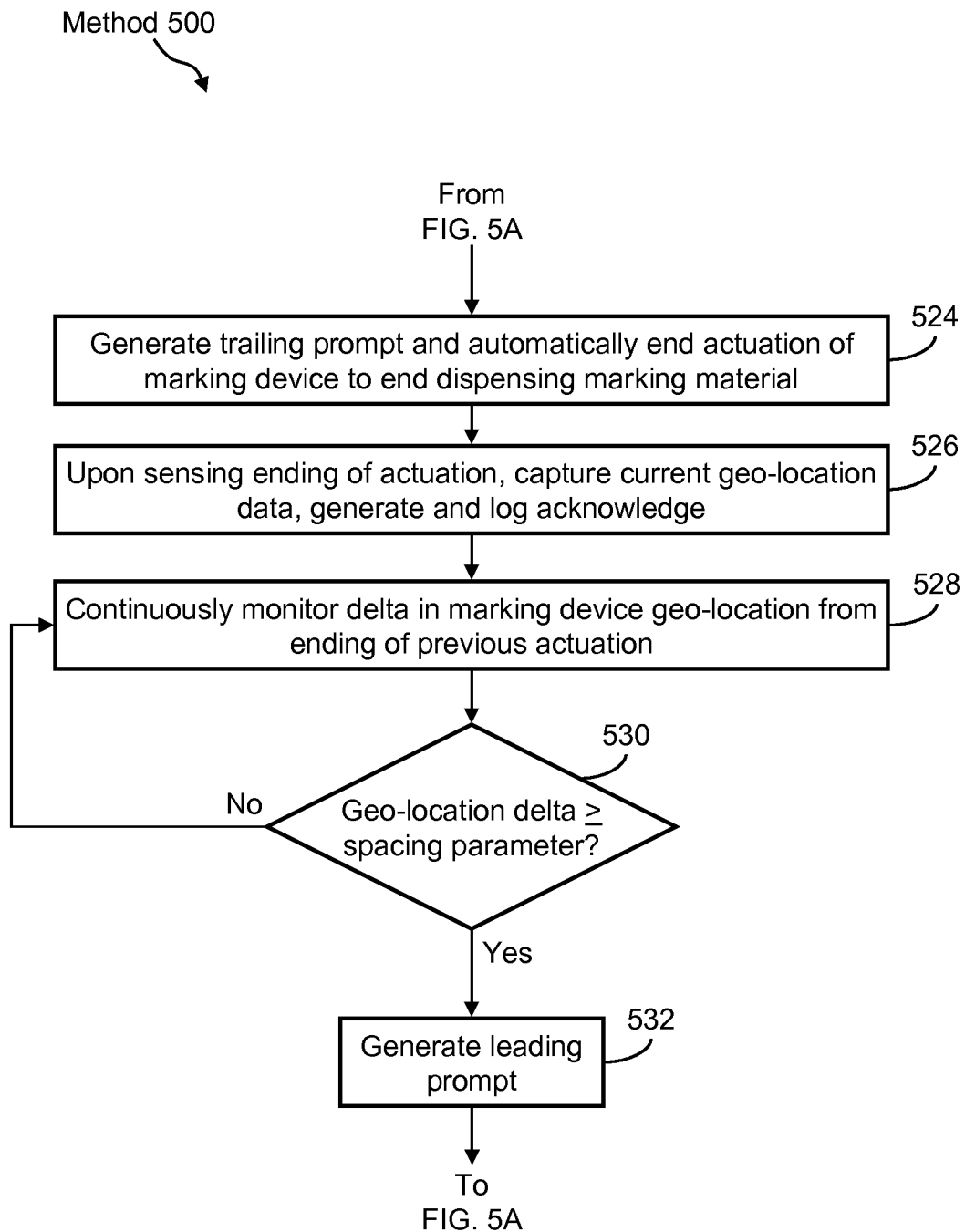

FIGS. 5A and 5B illustrate a flow diagram of a method 500, which is an example of a method of operation of marking device 112 of FIG. 2 having marking material control system 100 integrated therein. In particular, method 500 is an example of a method of operation that uses more automated operations, as compared with method 300 of FIG. 3. Method 500 may include, but is not limited to, the following acts, which may be implemented in any order.

In act 510, the marking device is activated, the current marking device geo-location data are acquired, and a query is automatically performed for the marking specifications that may correspond to the work site (e.g., based on governing authority in the jurisdiction, industry organization or association overseeing the geographic area, etc.). For example and referring again to FIG. 4, locate technician 410 activates marking device 112. Marking algorithm 130 of marking control application 110 acquires the current geo-location data 134 of marking device 112 from location tracking system 220. Based on the geographic location of marking device 112, marking algorithm 130 automatically queries marking specifications table 132 for the appropriate marking specifications (e.g., marking regulations of the regulatory body that corresponds to the work site location). Additionally, the relevant marking specifications (e.g., of the governing regulatory body) may vary seasonally or vary based on environmental conditions. Therefore, marking control application 110 may further query the relevant marking specifications for any seasonal information, ground conditions, or environmental conditions. For example, some marking specifications may be relevant to winter marking operations when there may be snow on the ground and other marking specifications may be relevant to non-winter marking operations when the surface of the ground is bare (grass, pavement, gravel, etc.).

In act 512, one or more parameters, such as color, of marking material 116 dispensed from marking device 112 may be detected by use of marking material detection mechanism 222. Subsequently, the facility type being marked may be determined by correlating the marking material color to facility type according, for example, to Table 4. In one example, red marking material 116 is detected by marking material detection mechanism 222, which correlates to electric power lines according to Table 4.

In act 514, marking specifications table 132 of marking control application 110 may be queried for the spacing and length parameters of the facility type determined in act 514 with respect to the regulatory body/authorities determined in act 510. For example, marking specifications table 132 may be queried for the spacing and length parameters of electric power lines with respect to the regulatory body/authorities determined in act 510 (e.g., when the regulatory body is determined in act 510 to be the third federal, regional, state, and/or local regulatory body of Table 3, Table 3 indicates that the spacing parameter for electric power lines is 5 feet and the length parameter for electric power lines is 18 inches).

In act 516, the marking device may be actuated by the user to begin dispensing marking material. The locate technician 410 may initiate the first actuation 420 by use of actuator 120 at the first mark 416 of the marking pattern 400, based on the determined location of facility 418. Subsequent actuations are based on leading prompts 412 as described below.

In act 518, upon sensing the beginning of the actuation of marking device 112, the current geo-location data 134 from location tracking system 220 of marking device 112 is captured by marking algorithm 130 of marking control application 110. Additionally, actuation system 218 generates actuator ACK 138 upon sensing the beginning of the actuation of marking device 112, which is returned to marking control application 110. For the first mark 416 of marking pattern 400, a record of first actuation 420 and associated actuator ACK 138 may be stored in actuation log 140. For subsequent marks 416 of marking pattern 400, a record of leading prompt 412, its associated actuator ACK 138 and the additional data described above may be stored in actuation log 140.

In act 520, marking algorithm 130 of marking control application 110 continuously monitors any change in the geo-location of marking device 112 from the beginning of each actuation. For example, marking algorithm 130 continuously compares the current geo-location data 134 from location tracking system 220 of marking device 112 to the geo-location data 134 at the beginning of the actuation and determines the geo-location delta therebetween.

In act 522, marking algorithm 130 of marking control application 110 determines whether the geo-location delta of marking device 112 is equal to or greater than, or within a predetermined range of, the length parameter determined in act 514 (e.g., 18 inches). Referring again to FIG. 4, the length parameter is indicated as a length l along each mark 416. If yes, method 500 may proceed, for example, to act 524. If no, method 500 may return, for example, to act 520.

In act 524, a trailing prompt is generated and the actuation of the marking device is automatically ended to end dispensing marking material. For example and referring again to FIG. 4, trailing prompt 414 may automatically trigger actuation system 218 of marking device 112 to end dispensing marking material 116 when forming mark 416.

In act 526, upon sensing the ending of the actuation of marking device 112, the current geo-location data 134 from location tracking system 220 of marking device 112 is captured by marking algorithm 130 of marking control application 110. Additionally, actuation system 218 generates actuator ACK 138 upon sensing the ending of the actuation of marking device 112, which is returned to marking control application 110. A record of trailing prompt 414, its associated actuator ACK 138 and the additional data described above may be stored in actuation log 140.

In act 528, marking algorithm 130 of marking control application 110 continuously monitors any change in the geo-location of marking device 112 from the ending of the previous actuation, where the ending of the previous actuation was the result of trailing prompt 414. For example, marking algorithm 130 continuously compares the current geo-location data 134 from location tracking system 220 of marking device 112 to the geo-location data 134 at the ending of the previous actuation and determines the geo-location delta therebetween.

In act 530, marking algorithm 130 of marking control application 110 determines whether the geo-location delta of marking device 112 is equal to or greater than, or within a predetermined range of, the spacing parameter determined in act 514 (e.g., 5 feet). Referring again to FIG. 4, the spacing parameter is indicated as a distance d between marks 416. If yes, method 500 may proceed, for example, to act 532. If no, method 500 may return, for example, to act 528.

In act 532, a leading prompt is generated. Referring again to FIG. 4, leading prompt 412 may be presented to locate technician 410 via marking device 112 for the purpose of prompting locate technician 410 to begin dispensing marking material 116 for forming marks 416 to indicate underground facilities. In some embodiments, leading prompt 412 may be presented to the locate technician 410 as a text message via the display of user device 122 of marking device 112, as an audible sound via the audible buzzer and/or speaker of user interface 122, as a vibration in the handle of marking device 112, and combinations thereof. In other embodiments, the leading prompt 412 may automatically trigger actuation system 212 of marking device 112 to begin dispensing marking material 116 to form the next mark 416. Method 500 then returns to act 516.

Referring again to FIGS. 4, 5A and 5B, as a result of multiple iterations of method 500, marks 416 are dispensed along the path of facility 418 by use of marking material control system 110 when implemented substantially within a marking device, such as marking device 112.

Referring again to FIGS. 3, 4, 5A and 5B, at any time during method 300 and/or method 500, respectively, the contents of actuation log 140 may be transmitted to and/or interrogated by any other business applications (not shown) to which the contents of actuation log 140 may be useful in underground facility locate applications. In one example, the contents of actuation log 140 may be useful to inventory applications of locate companies for tracking the usage of marking material. In another example, the contents of actuation log 140 may be useful to applications of locate companies for monitoring compliance with respect to the marking specifications of the controlling regulatory bodies or other authorities, and/or relating to contractual obligations of the locate companies.

Referring again to FIGS. 3, 4, 5A, and 5B, instead of generating both leading prompts 412 and trailing prompts 414 for dispensing marks 416, the duration of leading prompt 412 only may be used to indicate the beginning and ending of each mark 416. For example, the beginning of the audible sound of each leading prompt 412 indicates the beginning of each mark 416. The audible sound then persists while dispensing each mark 416 and ends to indicate the ending of each mark 416. In this way, the function of leading prompts 412 and trailing prompts 414 may be incorporated into a single persistent audible prompt.

Referring again to FIGS. 3, 4, 5A, and 5B, during method 300 and/or method 500, respectively, marking pattern 400 may include features that are the result of other parameters in lieu of and/or in combination with the spacing and length parameters of the marking specifications. For example, a prompt may be presented to the user of marking device 112 to dispense specified symbols and/or alphanumeric characters between marks 416 of marking pattern 400. In one example, the prompt may be presented to locate technician 410 between trailing prompt 414 and leading prompt 412 of every fifth mark 416. In this example, the prompt may be an audible tone in combination with a visual image (on the display of marking device 112) of the desired symbol and/or alphanumeric character to be dispensed. Again, the tone, volume, and/or duration of the audible sound may differ from the tone, volume, and/or duration of leading prompts 412 and trailing prompts 414, so that the locate technician 410 may differentiate between the meanings of the different prompts.

In summary, according to various embodiments described herein, marking material control system 100 and methods 300 and/or 500 of the present invention may use geo-location data 134 of marking device 112 in real time to query marking specifications table 132 to automatically determine the governing regulatory body or other relevant authority and then automatically determine the relevant marking specifications for use during marking operations.

Further, marking material control system 100 and methods 300 and/or 500 of the present invention use marking specifications of marking specifications table 132 in combination with facility type data 133 and geo-location data 134 from marking device 112 in real time to generate a real-time leading prompt, such as leading prompt 412, to indicate the beginning of the mark, followed by a real-time trailing prompt, such as trailing prompt 414, to indicate the ending of the mark.

Further, marking material control system 100 and methods 300 and/or 500 of the present invention may rely on the user's response to, for example, leading prompts 412 and trailing prompts 414 to facilitate compliance with marking specifications (e.g., ensure regulatory compliance) for dispensing marking material in marking operations and/or to avoid over spraying and/or under spraying marking material.

Further, marking material control system 100 and methods 300 and/or 500 of the present invention provide a means by which marking device 112 may be enabled only between, for example, leading prompt 412 and trailing prompt 414, thereby preventing marking material from being dispensed when not in compliance with the information in marking specifications table 132.

Further, marking material control system 100 and methods 300 and/or 500 of the present invention provide a means by which marking material 116 may be automatically dispensed from marking device 112 based on, for example, leading prompts 412, trailing prompts 414, and/or any other prompts without user action. In this scenario, marking material control system 100 and methods 300 and/or 500 are not dependent on manual responses of users to prompts in order to facilitate compliance with marking specifications (e.g., ensure regulatory compliance) and/or to avoid over spraying and/or under spraying marking material.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The above-described embodiments can be implemented in any of numerous ways. For example, the embodiments may be implemented using hardware, software or a combination thereof. When implemented in software, the software code can be executed on any suitable processor or collection of processors, whether provided in a single computer or distributed among multiple computers.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound-generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including a local area network or a wide area network, such as an enterprise network, and intelligent network (IN) or the Internet. Such networks may be based on any suitable technology and may operate according to any suitable protocol and may include wireless networks, wired networks or fiber optic networks.

The various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, various inventive concepts may be embodied as a computer readable storage medium (or multiple computer readable storage media) (e.g., a computer memory, one or more floppy discs, compact discs, optical discs, magnetic tapes, flash memories, circuit configurations in Field Programmable Gate Arrays or other semiconductor devices, or other non-transitory medium or tangible computer storage medium) encoded with one or more programs that, when executed on one or more computers or other processors, perform methods that implement the various embodiments of the invention discussed above. The computer readable medium or media can be transportable, such that the program or programs stored thereon can be loaded onto one or more different computers or other processors to implement various aspects of the present invention as discussed above.

The terms "program" or "software" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc., that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

Also, various inventive concepts may be embodied as one or more methods, of which an example has been provided.

The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. An apparatus for controlling a marking device used by a locate technician to perform a marking operation to mark a presence or an absence of at least one underground facility at a work site, the apparatus comprising:
   a memory to store processor-executable instructions; and
   at least one processing unit communicatively coupled to the memory, wherein upon execution of the processor-executable instructions, the at least one processing unit:
   A) generates at least one control signal relating to dispensing of a marking material by the marking device based at least in part on:
      marking specifications that define one or more marking patterns to be applied on ground, pavement or other surface at the work site;
      location information representative of a location of the marking device during the marking operation; and
      actuation information representative of one or more actuations of the marking device to dispense the marking material.

2. The apparatus of claim 1, wherein the marking specifications comprise one or more of: federal, state, or local regulations;
   industry recommendations, guidelines or best practices;
   locate company, locate contractor, and/or facility owner best practices or standard operating procedures; and
   specified contractual obligations for performance of the marking operation.

3. The apparatus of claim 1, wherein the marking specifications define a length of marks and a spacing between marks for a facility type to be marked.

4. The apparatus of claim 1, wherein the marking specifications define at least one marking symbol and/or marking character.

5. The apparatus of claim 1, wherein the marking specifications are stored in the memory as a table of marking regulations.

6. The apparatus of claim 1, wherein the location information includes geographic coordinates from a Global Positioning System (GPS).

7. The apparatus of claim 1, wherein the location information is based on geographic coordinates from a Global Positioning System (GPS) and data from an accelerometer and a compass.

8. The apparatus of claim 1, wherein upon execution of the processor-executable instructions, the at least one processing unit further:
   selects the marking specifications based at least in part on the location information.

9. The apparatus of claim 1, wherein upon execution of the processor-executable instructions, the at least one processing unit further:
   selects the marking specifications based at least in part on at least one of:
   a date of performance of the marking operation;
   ground conditions and/or ground type at the work site; and
   at least one environmental condition at the work site.

10. The apparatus of claim 1, wherein upon execution of the processor-executable instructions, the at least one processing unit further:
selects the marking specifications based at least in part on a type of the least one underground facility.

11. The apparatus of claim 1, wherein upon execution of the processor-executable instructions, the at least one processing unit further:
detects at least one attribute of the marking material; and
selects the marking specifications based at least in part on the detected at least one attribute.

12. The apparatus of claim 1, further comprising a communication interface communicatively coupled to the at least one processing unit, wherein upon execution of the processor-executable instructions, the at least one processing unit further:
controls the at least one communication interface so as to receive the marking specifications, the location information, and/or the actuation information from at least one external device.

13. The apparatus of claim 1, wherein the actuation information comprises:
a first signal representing an actuation of the marking device to begin dispensing the marking material; and
a second signal representing a de-actuation of the marking device to stop dispensing the marking material.

14. The apparatus of claim 1, wherein in A), the at least one processing unit generates the at least one control signal so as to automatically enable or disable dispensing of the marking material by the marking device based at least in part on the marking specifications, the location information, and the actuation information.

15. A system, comprising:
the apparatus of claim 1; and
the marking device,
wherein:
the memory and the processing unit are disposed within or mechanically coupled to the marking device; and
the marking specifications are stored in the memory.

16. The system of claim 15, further comprising a location tracking system communicatively coupled to the marking device to provide the location information.

17. The system of claim 16, wherein the marking device includes at least a portion of the location tracking system.

18. The system of claim 16, wherein the location tracking system comprises at least one of:
a GPS receiver;
a compass;
at least one accelerometer; and
a triangulation system.

19. The system of claim 18, wherein the location information includes geographic coordinates from a Global Positioning System (GPS) receiver.

20. The system of claim 18, wherein the location information is based on geographic coordinates from a Global Positioning System (GPS) and data from an accelerometer and a compass.

21. The system of claim 15, wherein the marking device further comprises an actuation system to provide the actuation information.

22. The apparatus of claim 21, wherein the actuation information comprises:
a first signal representing an actuation of the marking device to begin dispensing the marking material; and
a second signal representing a de-actuation of the marking device to stop dispensing the marking material.

23. The system of claim 15, wherein the marking device further comprises a marking material detection mechanism to detect at least one attribute of the marking material.

24. The system of claim 15, wherein the marking device further comprises a user interface to provide prompts to the locate technician using the marking device, wherein the prompts include at least one visual indication, at least one audible indication, and/or at least one vibratory indication.

25. The system of claim 24, wherein the at least one processor controls the user interface so as to generate a leading prompt via the user interface to indicate to the locate technician to begin dispensing the marking material.

26. The system of claim 24, wherein the at least one processor controls the user interface so as to generate a trailing prompt via the user interface to indicate to the locate technician to stop dispensing the marking material.

27. The system of claim 15, wherein the at least one processor controls the memory so as to store one or more of a leading prompt, a trailing prompt, the actuation information, the location information, timestamp information, and facility type in an actuation log.

28. The system of claim 15, further comprising at least one communication interface communicatively coupled to the at least one processing unit, wherein upon execution of the processor-executable instructions, the at least one processor:
controls the at least one communication interface so as to transmit the actuation log to an external device.

29. A computer-implemented method for controlling a marking device during a marking operation to mark a presence or an absence of at least one underground facility at a work site, the method comprising:
A) generating at least one control signal relating to dispensing of a marking material by the marking device based at least in part on:
marking specifications that define one or more marking patterns to be applied on ground, pavement or other surface at the work site;
location information representative of a location of the marking device during the marking operation; and
actuation information representative of one or more actuations of the marking device to dispense the marking material.

30. The method of claim 29, wherein the marking specifications comprise one or more of:
federal, state, or local regulations;
industry recommendations, guidelines or best practices;
locate company, locate contractor, and/or facility owner best practices or standard operating procedures; and
specified contractual obligations for performance of the marking operation.

31. The method of claim 29, wherein the marking specifications define a length of marks and a spacing between marks for a facility type to be marked.

32. The method of claim 29, wherein the location information includes geographic coordinates from a Global Positioning System (GPS).

33. The method of claim 29, further comprising:
selecting the marking specifications based at least in part on the location information.

34. The method of claim 29, further comprising:
selecting the marking specifications based at least in part on at least one of:
a date of performance of the marking operation;
ground conditions and/or ground type at the work site; and
at least one environmental condition at the work site.

35. The method of claim 29, further comprising:
selecting the marking specifications based at least in part on a type of the least one underground facility.

36. The method of claim 29, further comprising:
detecting at least one attribute of the marking material; and
selecting the marking specifications based at least in part on the detected at least one attribute.

37. The method of claim 29, wherein the actuation information comprises:
a first signal representing an actuation of the marking device to begin dispensing the marking material; and
a second signal representing a de-actuation of the marking device to stop dispensing the marking material.

38. The method of claim 29, wherein A) comprises:
automatically enabling or disabling dispensing of the marking material by the marking device based at least in part on the marking specifications, the location information, and the actuation information.

39. The method of claim 19, wherein the marking device comprises a user interface, and wherein the method further comprises:
providing one or more prompts, via the user interface, to the locate technician using the marking device, wherein the prompts include at least one visual indication, at least one audible indication, and/or at least one vibratory indication.

40. A computer-readable storage medium encoded with computer-readable instructions that, as a result of being executed by a computing device, control the computing device to perform a method for controlling a marking device during a marking operation to mark a presence or an absence of at least one underground facility at a work site, the method comprising:
A) generating at least one control signal relating to dispensing of a marking material by the marking device based at least in part on:
marking specifications that define one or more marking patterns to be applied on ground, pavement or other surface at the work site;
location information representative of a location of the marking device during the marking operation; and
actuation information representative of one or more actuations of the marking device to dispense the marking material.

\* \* \* \* \*